(12) United States Patent
Shiga et al.

(10) Patent No.: US 8,676,951 B2
(45) Date of Patent: Mar. 18, 2014

(54) TRAFFIC REDUCTION METHOD FOR DISTRIBUTED KEY-VALUE STORE

(75) Inventors: Kenta Shiga, Singapore (SG); Lin Wujuan, Singapore (SG)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 13/192,047

(22) Filed: Jul. 27, 2011

(65) Prior Publication Data
US 2013/0031229 A1     Jan. 31, 2013

(51) Int. Cl.
*G06F 15/173* (2006.01)

(52) U.S. Cl.
USPC .......................................................... 709/223

(58) Field of Classification Search
USPC ............... 709/223; 707/1, 100, 205, 736, 715
See application file for complete search history.

(56) References Cited

U.S. PATENT DOCUMENTS

| | | | |
|---|---|---|---|
| 2003/0056082 A1* | 3/2003 | Maxfield ............................ | 712/4 |
| 2004/0015478 A1* | 1/2004 | Pauly ................................. | 707/1 |
| 2008/0040406 A1* | 2/2008 | Maxfield .......................... | 707/205 |
| 2009/0157701 A1* | 6/2009 | Lahiri et al. ..................... | 707/100 |
| 2010/0106934 A1* | 4/2010 | Calder et al. .................... | 709/223 |
| 2010/0281013 A1* | 11/2010 | Graefe ............................ | 707/715 |
| 2010/0332471 A1* | 12/2010 | Cypher ........................... | 707/736 |
| 2010/0332579 A1 | 12/2010 | Sengupta et al. | |

OTHER PUBLICATIONS

"Hierarchical Peer-to-Peer Systems", L.Garces-Erice, et al., Parallel Processing Letters, 2003 (as discussed in the specification).

* cited by examiner

*Primary Examiner* — Quang N Nguyen
(74) *Attorney, Agent, or Firm* — Brundidge & Stanger, P.C.

(57) ABSTRACT

In a system of local DHT overlays, each has KVS nodes, including one super node. The super nodes organize a global DHT overlay. Each super node maintains Bloom filters of keys in its local DHT overlay for all key ranges. To obtain data corresponding to a key from other local DHT overlays, a super node sends a request to a node which is responsible for the key range hashed from the specified key. The responsible node determines local DHT overlays which may have data corresponding to the key according to Bloom filters registered in the super nodes of the local DHT overlays, updated and converted from counting filters. Requests are sent to the super nodes of the local DHT overlays identified by the responsible node. Thus, requests are not needlessly sent to super nodes of local DHT overlays which do not have data corresponding to the key, thereby reducing traffic.

18 Claims, 23 Drawing Sheets

Key-Value Table 41

| Key | | Value | | |
|---|---|---|---|---|
| K1 | Name | Description | Dept | Tel |
|  | Andrew | Network Administrator | IT | 1234 |
| K2 | Name | Description | Dept | Mobile |
|  | Bob | Sales of Network Storage | Sales | 9876 |
| ... | ... | ... | ... | ... |

Figure 5

Local DHT Routing Table 42

| IP Address | Local ID |
|---|---|
| 192.168.1.2 | 40 |
| 192.168.1.3 | 70 |
| ... | ... |

Figure 6

Global DHT Routing Table 43

| IP Address | Group ID | Global ID |
|---|---|---|
| 192.168.2.1 | B | 27 |
| 192.168.3.1 | C | 56 |
| 192.168.4.1 | D | 78 |
| ... | ... | ... |

Figure 7

Node Filter Table 44

| Key Range ID (441) | Counting Filter (442) |
|---|---|
| 1 | 122...301 |
| 2 | 000...100 |
| 3 | 201...000 |
| ... | ... |

Figure 8

Group Filter Table 45

| Group ID (451) | Bloom Filter (452) |
|---|---|
| A | 011...101 |
| B | 110...110 |
| C | 101...001 |
| D | 010...001 |
| ... | ... |

Figure 9

Group Key Range Table 46

| Key Range ID (461) | Min Value (462) | Max Value (463) |
|---|---|---|
| 1 | 0 | 19 |
| 2 | 20 | 39 |
| 3 | 40 | 59 |
| ... | ... | ... |

Figure 10

Accuracy Table 47

| Number of Total Requests (471) | Number of Failed Requests (472) | Threshold (473) |
|---|---|---|
| 10000 | 200 | 50% |

Node Key Range Table 50

| Key Range ID (501) | Min Value (502) | Max Value (503) |
|---|---|---|
| 1 | 0 | 4 |
| 2 | 5 | 9 |
| 3 | 10 | 14 |
| 4 | 15 | 19 |
| ... | ... | ... |

System Key Range Table 49

| Group ID | Key Range List |
|---|---|
| A | 0,10,20,30,40,50,60,70,80,90 |
| B | 0,20,40,60,80 |
| C | 0,20,40,60,80 |
| D | 0,20,40,60,80 |
| ... | ... |

Index Table 51

| Key | Value |
|---|---|
| Network | Key List |
| | K1, K2 |
| Storage | Key List |
| | K2 |
| ... | ... |

Figure 35

TRAFFIC REDUCTION METHOD FOR DISTRIBUTED KEY-VALUE STORE

BACKGROUND ANALYSIS

Recently there have been demands for technologies which enable enterprises to analyze large amounts of data and utilize the results of analysis to provide customers with new services. Such data might be distributed not only within one data center but also across a plurality of data centers. A KVS (Key-Value Store) is one type of storage that holds a large amount of data. The KVS is a simple database which enables users to store and read data (values) with a unique key.

Meanwhile, network bandwidth, especially WAN (Wide Area Network) bandwidth, has grown at a much smaller pace than the growth of data transmission. Therefore, for data distributed across devices at a plurality of locations, reduction in the amount of data communicated between locations is a major challenge.

One method for distributing a KVS across devices at a plurality of locations is discussed in "Hierarchical Peer-to-Peer Systems" (L. Garces-Erice, et al., Parallel Processing Letters 2003). In the hierarchical distributed hash table (DHT) technology disclosed in this paper, devices at a near location comprise a local DHT overlay, one device in each local DHT overlay is selected as a super node, and the super nodes comprise a global DHT overlay. A device can access any data stored not only in the same local DHT overlay but also in another local DHT overlay via the global DHT overlay. However, if a device requests data corresponding to a key, then the request is dispatched to all other local DHT overlays via the global DHT overlay even though some of local DHT overlays do not have data corresponding to the key. Therefore, unnecessary traffic flows between some locations.

U.S. pre-grant publication No. 2010/0332579 also discloses techniques for sharing content among peers by using a hierarchical DHT technology. According to this publication, local domains are organized into hierarchical clusters based on their proximity. A peer searches for a given piece of content in a proximity-guided manner and terminates at the earliest local domain which has the content. The publication assumes that there is a single name space of keys or content identifiers. However, each local domain may have its own name space. In this case, more than one content may have the same key or content identifier. The publication does not cope with such a case.

SUMMARY

In the present disclosure, a method provides a KVS which enables users to transparently access data are distributed to devices at different locations and reduce amount of traffic across the locations.

In an embodiment to which this is applied, KVS nodes at a near location comprise a local DHT overlay. One node is selected as a super node in each local DHT overlay, and the super nodes themselves comprise a global DHT overlay. Hash values of keys are divided into two or more ranges (key ranges). The super node in each local DHT overlay maintains Bloom Filters of keys in the local DHT overlay for all key ranges. As is known, a Bloom Filter is used as a bitmap which enables users to determine whether data exists in a set. In the present situation, a known Bloom Filter can be used to determine whether a key exists in a set of keys. A super node determines a responsible node (a super node which is responsible for each key range) and registers a Bloom Filter for the key range in the responsible node.

Although parameters of Bloom Filters are generally customizable, Bloom Filters having the same parameters are used in the preferred embodiments.

To obtain data corresponding to a key from other local DHT overlays, a node sends a request to a super node in the same local DHT overlay (the local DHT overlay to which the requesting node also belongs). Then, the super node determines a key range to which the key belongs and sends a request to the responsible node which is responsible for the key range. The responsible node determines local DHT overlays which may have data corresponding to the key according to Bloom Filters registered in the super nodes of the local DHT overlays, and sends information on these local DHT overlays to the requesting super node. Next, the super node sends requests to the super nodes of the local DHT overlays identified by the responsible node. In the alternative, the responsible node may send the requests to the super nodes of the local DHT overlays directly, without the intervening super nodes. In that case, the super node receiving a request can respond to the responsible node or directly to the super node that sent the request to the responsible node.

In this manner, the requesting super node or responsible node does not send requests needlessly to other super nodes of local DHT overlays which do not have data corresponding to the key. As a result, the amount of traffic among local DHT overlays or locations can be reduced in comparison to other methods and systems.

Further aspects and advantages of the invention will become apparent by reference to the drawing and detailed description that follows.

BRIEF DESCRIPTION OF THE DRAWING

FIG. 5 shows an example of a user-created Key-Value Table.

FIG. 6 shows an example of a Local DHT Routing Table.

FIG. 7 shows an example of a Global DHT Routing Table.

FIG. 8 shows an example of a Node Filter Table.

FIG. 9 shows an example of a Group Filter Table.

FIG. 10 shows an example of a Group Key Range Table.

FIG. 35 shows an example of an Index Table 51.

DETAILED DESCRIPTION

Figure 1:
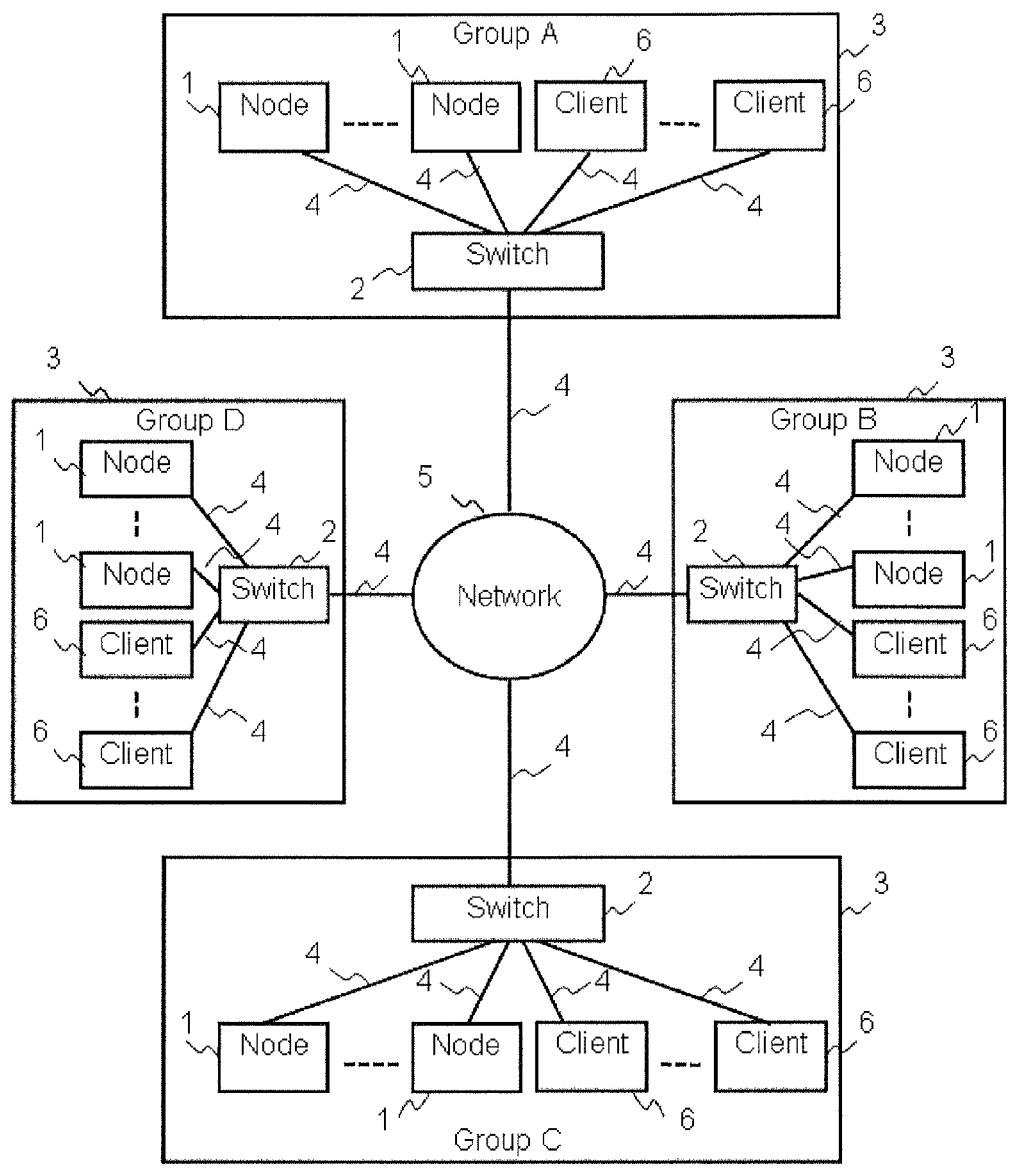
FIG. 1 is an exemplary diagram of an overall system.

FIG. 1 is an exemplary diagram of an overall network system. The illustrated system has one or more Groups 3. A Group 3 represents a group of devices which are located a short distance from each other. Each Group 3, as shown, has one or more Nodes 1, one or more Clients 6 and a Switch 2. Each Node 1 is connected to Switch 2 of the same Group 3 via a communication line 4. Each Client 6 also is connected to Switch 2 of the same Group 3 via a communication line 4. Switch 2 is connected to a Network 5 via another communication line 4. Nodes 1 are storage nodes where Key-Value data are stored. Clients 6 are devices (such as PCs) which access the Key-Value data stored in Nodes 1.

Figure 33:
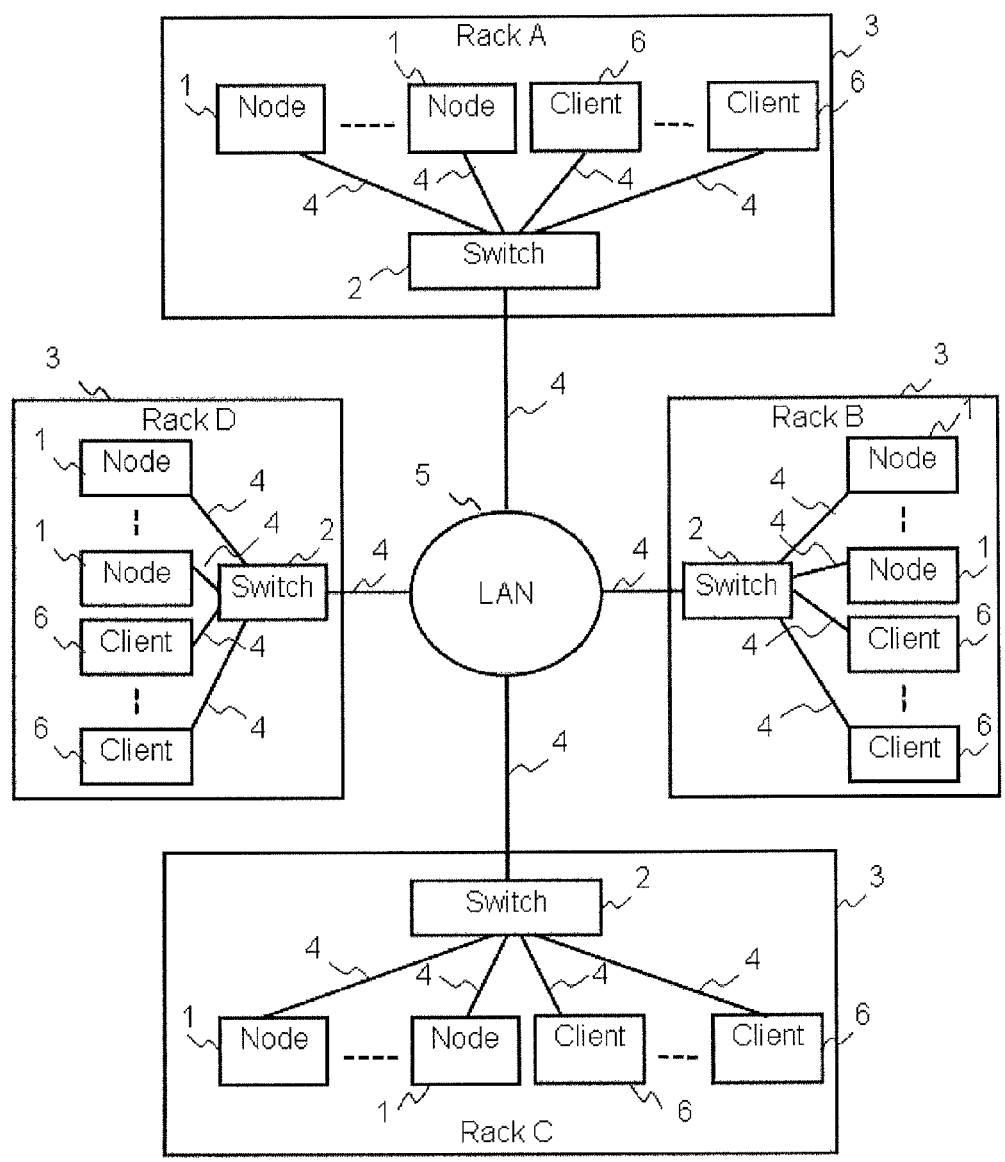
FIG. 33 is an exemplary diagram of an overall LAN system.

For example, a Group 3 might be a group of devices which are located on the same rack. In this example, Network 5 could be a LAN (Local Area Network). FIG. 33 is an exemplary diagram of an overall network system in this example.

Figure 34:
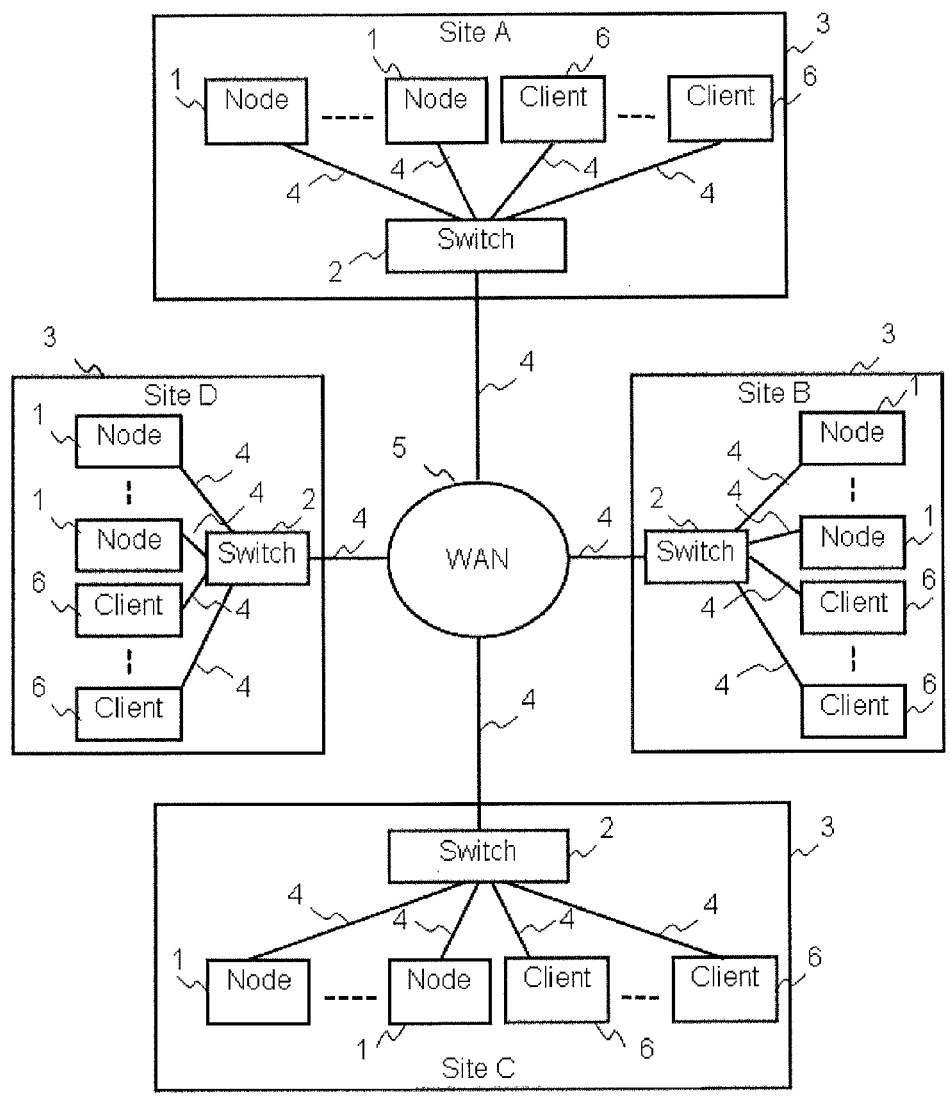
FIG. 34 is an exemplary diagram of an overall WAN system.

Alternatively, a Group 3 might be a group of devices which are located at the same data center. In this example, Network 5 could be a WAN (Wide Area Network). FIG. 34 is an exemplary diagram of an overall network system in this example.

Figure 2:
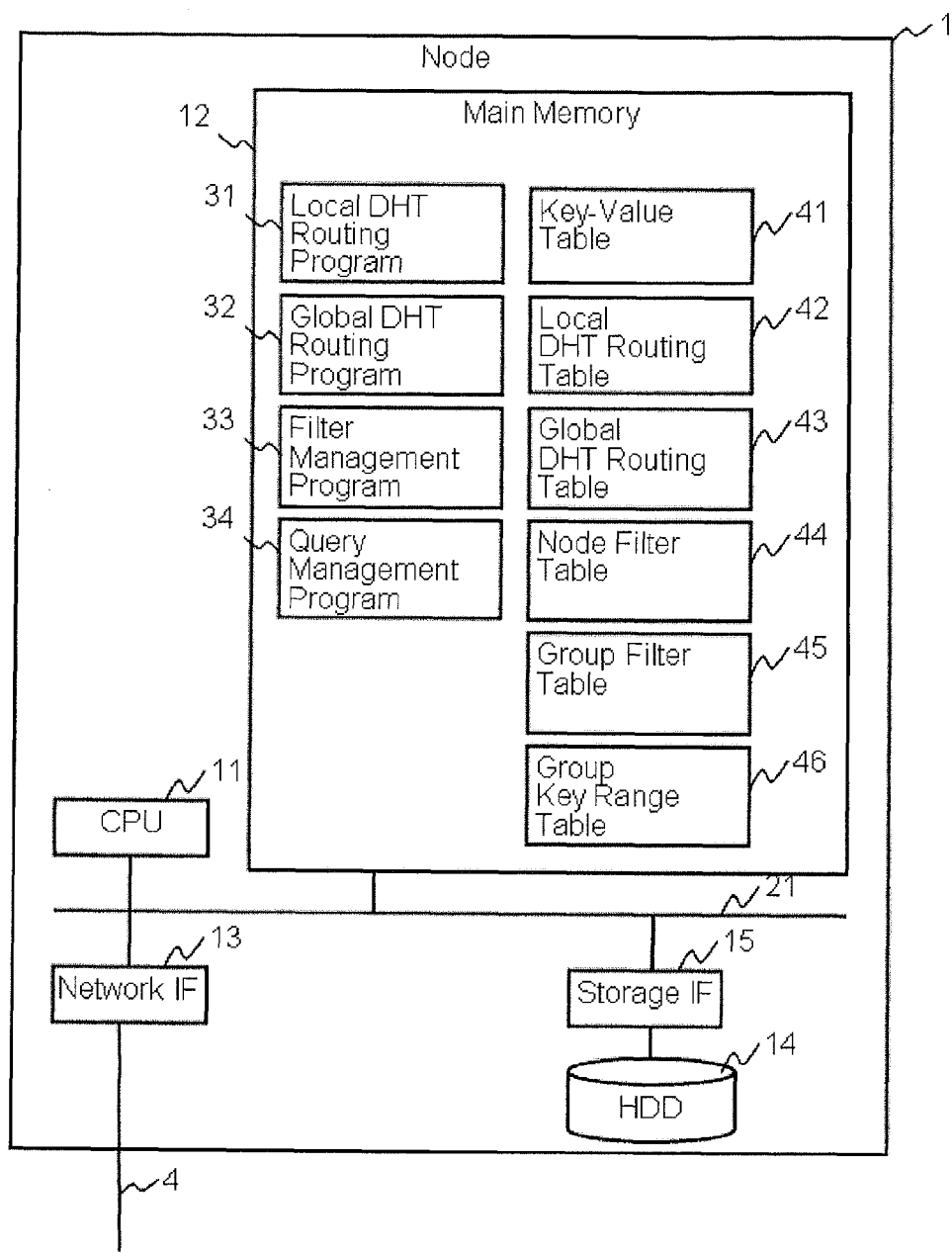
FIG. 2 is a block diagram schematically illustrating components within a node.

FIG. 2 is a block diagram schematically illustrating components within a Node 1. Node 1 may have, but is not limited to, a CPU (Central Processing Unit) 11, a Network IF (interface) 13, a Storage IF 15, a main memory 12, storage media such as HDD (Hard Disk Drives) 14 and a system bus 21. The main memory 12 may further include a Local DHT (Distributed Hash Table) Routing Program 31, a Global DHT Routing Program 32, a Filter Management Program 33, and a Query Management Program 34, which are computer programs stored in the HDD 14, copied from the HDD 14 to the main memory 12 and executed by the CPU 11. The main memory 12 may further include one or more Key-Value Tables 41, a Local DHT Routing Table 42, a Global Routing Table 43, a Node Filter Table 44, a Group Filter Table 45, and a Group Key Range Table 46, which are stored in the HDD 14, copied from the HDD 14 to the main memory 12, read and/or written by the programs and copied back from the main memory 12 to the HDD 14. The Storage IF 15 manages the storage from the HDD or a storage area network (SAN), for example, and provides raw data storage to the programs. The Network IF 13 connects the Node 1 to the Network 5 via the communication line 4 and is used for communication with other Nodes 1 and Clients 6. The CPU 11 represents a central processing unit that executes the computer programs. Commands and data communicated between the CPU and other components are transferred via the system bus 21.

Figure 3:
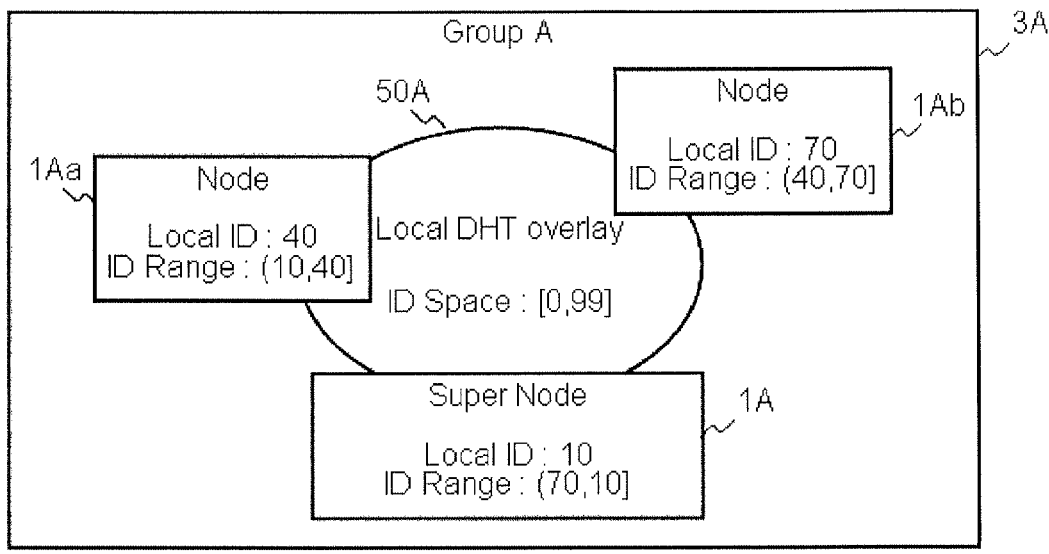
FIG. 3 shows an exemplary high level overview of a logical architecture of nodes organized into a Local DHT Overlay.

FIG. 3 shows a high level overview of a logical architecture of the Nodes 1, where the Nodes 1 in the same Group 3 (e.g. Group A 3A) are organized into a Local DHT Overlay 50A. A Local DHT overlay 50A manages an ID space, organized illustratively into a logical ring where the smallest ID succeeds the largest ID. Key-Value data and Nodes 1 are hashed to the same ID space. A hash value is assigned to a responsible Node 1 whose Node ID (Local ID) is numerically closest clockwise in the ID space to the hash value. A Node 1 obtains its Local ID by executing the Local DHT Routing Program 31 to calculate the hash value (local DHT hash value) of its IP address. With a collision-free hash function, such as 160-bit SHA-1 or the like, the Local ID assigned to a Node 1 will be unique in the same Group 3.

Each Node 1 in the Local DHT overlay 50A is responsible for a range of ID space that has no overlap with the ID ranges managed by other Nodes 1 in the same Local DHT overlay 50A. FIG. 3 shows the ID range managed by each Node 1 in a Local DHT overlay 50A with ID space [0,99]. As noted, the ID space illustratively forms a logical ring, schematically considered and illustrated, in which the ID range managed by the Node 1Ab with Local ID 70 is (40~70], the ID range managed by its predecessor Node 1A with Local ID 10 is (70~10], and the ID range managed by its successor Node 1Aa (the successor node of the Node 1Ab) with Local ID 40 is (10~40], and so on. Each Node 1 thus maintains at least 2 Nodes (its predecessor and successor) in the same Local DHT overlay 50A to which it belongs.

FIG. 6 illustrates an example of a Local DHT Routing Table 42 that shows an IP address 421 mapped to a Local ID 422 by calculating the local DHT hash value of the IP address. In the example, the local DHT hash value of a Node's IP address, 192.168.1.2, is 40, and therefore, the Local ID of the Node 1Aa is assigned as 40 (FIG. 3).

Each Local DHT Routing Table 42 stores information of other Nodes 1 known by the current Node 1. The Local DHT Routing Program 31 uses and updates the information in the Local DHT Routing Table 42, to corporately form the Local DHT overlay 50A. In the example of FIG. 6, the Local DHT Routing Table 42 is maintained in the Node 1A with Local ID 10 in the Local DHT overlay 50A. The Local DHT Routing Table 42 may consist of, but is not limited to, two columns, including IP address 421 and Local ID 422.

One Node 1 in the same Group 3 is selected as a Super Node. The way to choose one Node 1 to be the Super Node is not limited. For example, in this embodiment, a Node 1 with the smallest Local ID becomes a Super Node. Alternatively, the node 1 with the largest Local ID may be selected as a Super Node. In FIG. 3, the Node 1A with Local ID 10 is a Super Node for Group A 3A. Super Nodes comprise a Global DHT overlay 60 across Groups 3.

Figure 4:
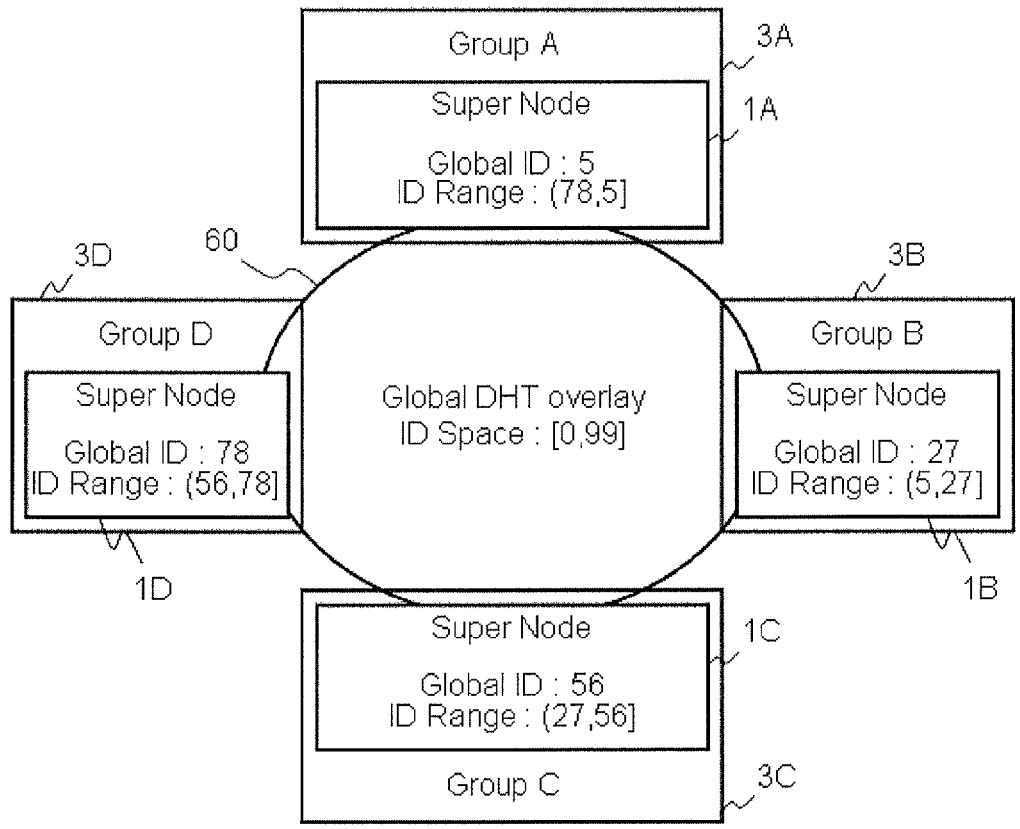
FIG. 4 shows an exemplary high level overview of a logical architecture of a Global DHT Overlay.

FIG. 4 shows a high level overview of a logical architecture of the Global DHT Overlay 60. The Global DHT overlay 60 manages an ID space similarly to Local DHT overlays. Super Nodes are hashed to the same ID space. A hash value is assigned to a responsible Super Node whose Node ID (Global ID) is numerically closest clockwise in the ID space to the hash value.

A Super Node obtains its Global ID by executing the Global DHT Routing Program 32 to calculate the hash value (global DHT hash value) of its IP address and Group ID. Therefore, a Super Node has both a Local ID and a Global ID. With a collision-free hash function, such as 160-bit SHA-1 or the like, the Global ID assigned to a Super Node will be unique across Groups 3.

Each Super Node in the Global DHT overlay 60 is responsible for a range of ID space that has no overlap with the ID ranges managed by other Super Nodes in the same Global DHT overlay 60. FIG. 4 shows the ID range managed by each Super Node in a Global DHT overlay 60 with ID space [0,99]. It should be noted that the ID space illustratively forms a circle, and therefore the ID range managed by the Super Node 1D with Global ID 78 is (56~78], the ID range managed by the Super Node 1A with Global ID 5 is (78~5], the ID range managed by the Super Node 1B with Global ID 27 is (5~27], and the ID range managed by the Super Node 10 with Global ID 56 is (27~56], and so on.

Each Super Node maintains a Global DHT Routing Table 43, which stores information of other Super Nodes known by the current Super Node. Each Super Node executes a Global DHT Routing Program 32, which uses and updates the information in the Global DHT Routing Table 43, to corporately form the Global DHT overlay 60. FIG. 7 shows an example of a Global DHT Routing Table 43 maintained in a Super Node which, in example described here, is the Super Node 1A with Global ID 5 in the Global DHT overlay 60. A Global DHT Routing Table 43 may have, but is not limited to, three columns, including IP address 431, Group ID 432 and Global ID 433. Global ID 433 is calculated from the global DHT hash value of the combination of the IP address and the Group ID. In this example, an ID space [0-99] is illustrated. As in the example, the global DHT hash value of a Super Node's IP address, 192.168.2.1 and Group ID, B, is 27, and therefore, the Global ID of the Super Node is assigned as 27. It should be noted that a Super Node maintains at least two Super Nodes (its predecessor and successor) in the same Global DHT overlay 60 to which it belongs. The predecessor of a Super Node in a Global DHT overlay 60 is the Super Node whose Global ID is numerically closest counterclockwise in the ID space. The successor of a Super Node in a Global DHT overlay 60 is the Super Node whose Global ID is numerically closest clockwise in the ID space. In this example, for the Super Node 1A with Global ID 5 in the Global DHT overlay 60, its predecessor is the Super Node 1D with Global ID 78, and its successor is the Super Node 1B with Group ID 27.

Key-Value data created by users are illustratively organized in a logical table structure with rows and columns, where each row represents a key-value pair (one column as the key and the remaining columns as the value). FIG. 5 shows an example of a user-created Key-Value Table 41 having two columns, including Key 411 and Value 412. Each row has different sub-columns within Value 412. For example, a row 418 whose Key 411 is K1 has four columns including Name 413, Description 414, Dept (department) 415, and Tel (telephone number) 416. Meanwhile, a row 419 whose Key 411 is K2 has four columns including Name 413, Description 414, Dept 415, and Mobile (mobile telephone number) 417.

Key-Value data are distributed to the Nodes 1 and stored in their Key-Value Tables 41. More specifically, in the case of addition of a key-value pair, a local DHT hash value for the key is calculated. Then, the Node 1 which is responsible for the key-value pair is determined based on the local DHT hash value and ID range of Node 1, and the key-value pair is stored in Key-Value Tables 41 of the determined Node 1.

Keys of the Key-Value data are also divided into multiple ranges, called key ranges, based on the global DHT hash values of the keys. In this embodiment, the same key ranges are pre-configured in all Nodes 1. The key ranges are stored in a Group Key Range Table 46. FIG. 10 shows an example of a Group Key Range Table 46. A Group Key Range Table 46 may have, but is not limited to, three columns, including Key Range ID 461 that corresponds to each of the keys in Key Value Table 41; Min Value 462 and Max Value 463. Min Value 462 and Max Value 463 are a minimum value and a maximum value of global DHT hash values of keys for a key range, respectively.

FIG. 8 shows an example of a Node Filter Table 44. Each Node 1 has a Node Filter Table 44. A Node Filter Table 44 may have, but is not limited to, two columns, including Key Range ID 441 and Counting Filter 442. A Node Filter Table 44 maintains Counting Filters for all key ranges. Initial values of Counting Filter 442 in all rows are all zero. A Super Node calculates the Group Filter for each of the key ranges from the Counting Filters in the Node Filter Table 44. Then the Super Node decides what is responsible for each key range. Details will be explained using FIG. 15.

FIG. 9 shows an example of a Group Filter Table 45. A Super Node which is responsible for a particular key range has a Group Filter Table 45 containing Bloom Filters of all Groups 3 for the key range. A Group Filter Table 45 may have, but is not limited to, two columns, including Group ID 451 and Bloom Filter 452.

If a key is deleted, a Bloom Filter needs to be re-calculated and such re-calculation usually takes a long time. To avoid this, each Node 1 maintains a Counting Filter instead of a Bloom Filter. A Counting Filter replaces each bit of a Bloom Filter with a counter. That is, each counter corresponds to each bit of the filter hash value. When a key is added, counters corresponding to hash values of the key are incremented. Thus, the bits of the Bloom Filter corresponding to the incremented counters are set. On the other hand, when a key is deleted, counters corresponding to hash values of the key are decremented, but a bit of the Bloom Filter corresponding to a decremented counter is only reset if the decremented counter is decremented to zero.

An architect can select any number of filter hash values and any number of bits of filter hash value (or counters of Counting Filters).

Figure 14:
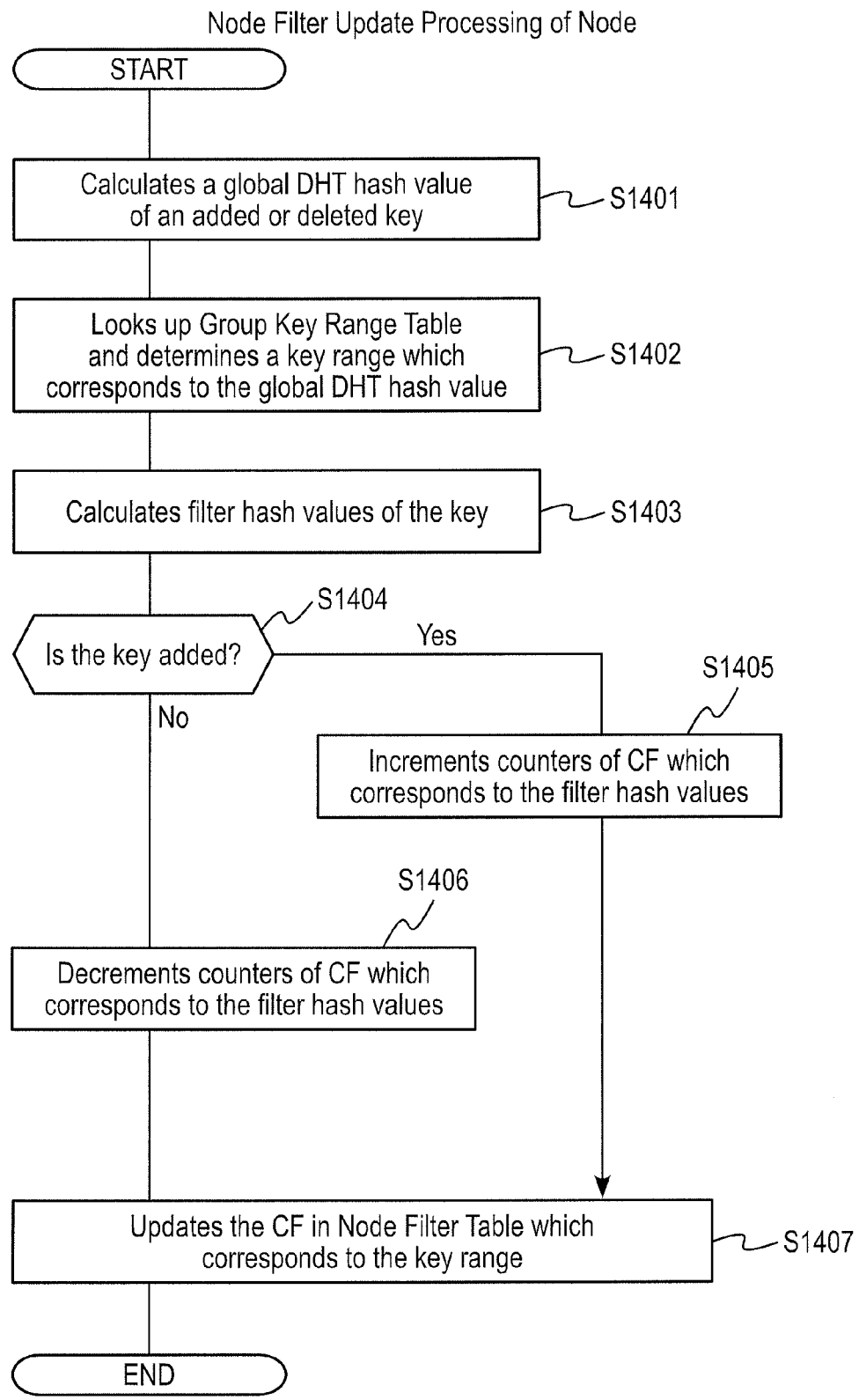
FIG. 14 is a flow diagram illustrating exemplary steps of Node Filter Update Processing.

FIG. 14 is a flow diagram illustrating exemplary steps of Node Filter Update Processing. Node 1 executes this processing by using a Filter Management Program 33 when a new row is added to a Key-Value Table 41 or a row is deleted from the Key-Value Table 41. First, the Node 1 calculates a global DHT hash value of a key of the added or deleted row (S1401). The Node 1 looks up a Group Key Range Table 46 and determines a key range to which the global DHT hash value belongs. The Node 1 reads a Counting Filter 442 for the key range from a Node Filter Table 44 (S1402). Then, the Node 1 calculates hash values of the key by using hash functions prepared for the Counting Filter (S1403). Such hash values are called filter hash values in this embodiment. If the key is added (S1404), the Node 1 increments counters of the Counting Filter which correspond to the filter hash values (S1405). If the key is deleted (not added), the Node 1 decrements counters of the Counting Filter which correspond to the filter hash values (S1406). Lastly, the Node 1 updates the Counting Filter 442 in the Node Filter Table 44 (S1407).

Figure 15:
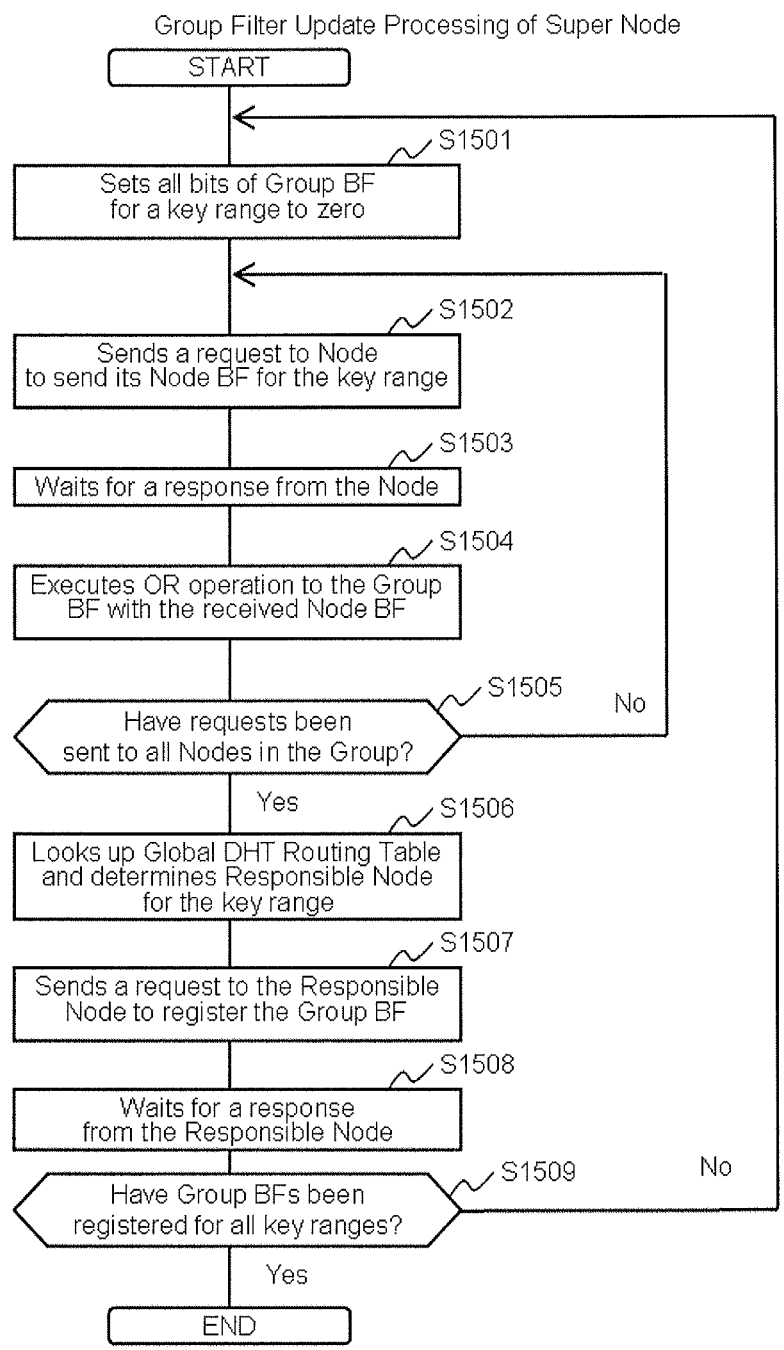
FIG. 15 is a flow diagram illustrating exemplary steps of Group Filter Update Processing executed by a Super Node.

FIG. 15 is a flow diagram illustrating exemplary steps of Group Filter Update Processing by a Super Node. A Super Node executes this processing by using a Filter Management Program 33 periodically. First, the Super Node sets all bits of a Bloom Filter that it maintains (Group Bloom Filter) to zero for a first key range (S1501). The Super Node sends a request to a first Node 1 in the same Group 3 to send a Bloom Filter of the Node 1 (Node Bloom Filter) for the key range (S1502) and waits for a response from the Node 1 (S1503). Then the Super Node extracts the Node Bloom Filter from the response and executes an OR (logical disjunction) operation to the Group Bloom Filter and the Node Bloom Filter (S1504). The Super Node repeats steps S1502 to S1504 for all Nodes 1 and itself (S1505).

Next, the Super Node looks up a Global DHT Routing Table 43 and determines a Super Node which is responsible for storing Group Bloom Filters for the key range of all Groups 3 (S1506). Such Super Node is called as a Responsible Node in this embodiment. A Responsible Node for a key range may be determined based on a maximum or a minimum value of the key range. For example, a Responsible Node for a key range may be a Super Node with a Global ID which is numerically closest clockwise to a global DHT hash value of a maximum value of the key range. Then, the Super Node sends a request to the Responsible Node determined in step S1506 to register the Group Bloom Filter for the key range (S1507) and waits for a response from the Responsible Node (S1508). The Super Node repeats steps S1501 to S1508 for all key ranges (S1509).

Figure 16:
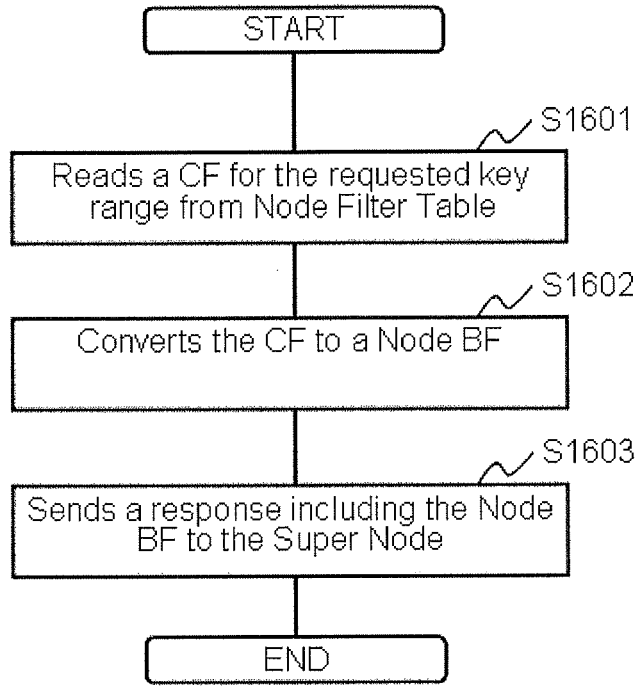
FIG. 16 is a flow diagram illustrating exemplary steps of Node Filter Sending Processing executed by a Node.

FIG. 16 is a flow diagram illustrating exemplary steps of Node Filter Sending Processing performed by a Node 1. A Node 1 executes this processing by using a Filter Management Program 33 when the Node 1 receives a request from a Super Node to send a Node Bloom Filter of the Node 1 for a specified key range. First, the Node 1 reads a Counting Filter for the key range from a Node Filter Table 44 (S1601). Next, the Node 1 converts the Counting Filter to a Node Bloom Filter (S1602). This conversion can be done in the following manner: If a particular counter of the Counting Filter is zero, then a bit of the Node Bloom Filter corresponding to the counter is set to be zero. If a particular counter of the Counting Filter is not zero, then a bit of the Node Bloom Filter corresponding to the counter is set to be one. After conversion, the Node 1 sends a response including the Node Bloom Filter to the Super Node (S1603).

Figure 17:
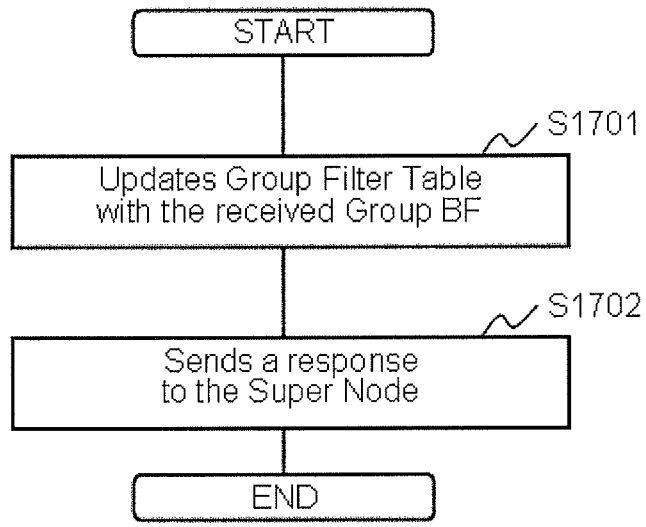
FIG. 17 is a flow diagram illustrating exemplary steps of Group Filter Registration Processing executed by a Responsible Node.

FIG. 17 is a flow diagram illustrating exemplary steps of Group Filter Registration Processing performed by a Responsible Node. A Responsible Node executes this processing by using a Filter Management Program 33 when the Responsible Node receives a request from a Super Node to register a Group Bloom Filter of a Group 3 for a specified key range. First, the Responsible Node updates its Group Filter Table 45 according to the request (S1701). The Responsible Node then sends a response to the Super Node confirming the updating (S1702).

In step S1701, the Responsible Node updates a Bloom Filter 452 in the Group Filter Table 45 which corresponds to the Group 3 to which the Super Node that sent the request belongs. Finally, the Responsible Node sends a response to the Super Node (S1702) confirming the updating.

Hereinafter, query processing is explained.

When a Client 6 specifies a key and requests a value which corresponds to the key from a Node 1, the Node 1 calculates a local DHT hash value of the key, determines a Node 1 which is responsible for the key by looking up a Local DHT Routing Table 42 and sends a request to that Node 1. If the Client 6 requests values which correspond to the key from other Groups 3, the Node 1 that receives the request from the client sends the request to a Super Node in the same Group 3 as well.

Figure 18:
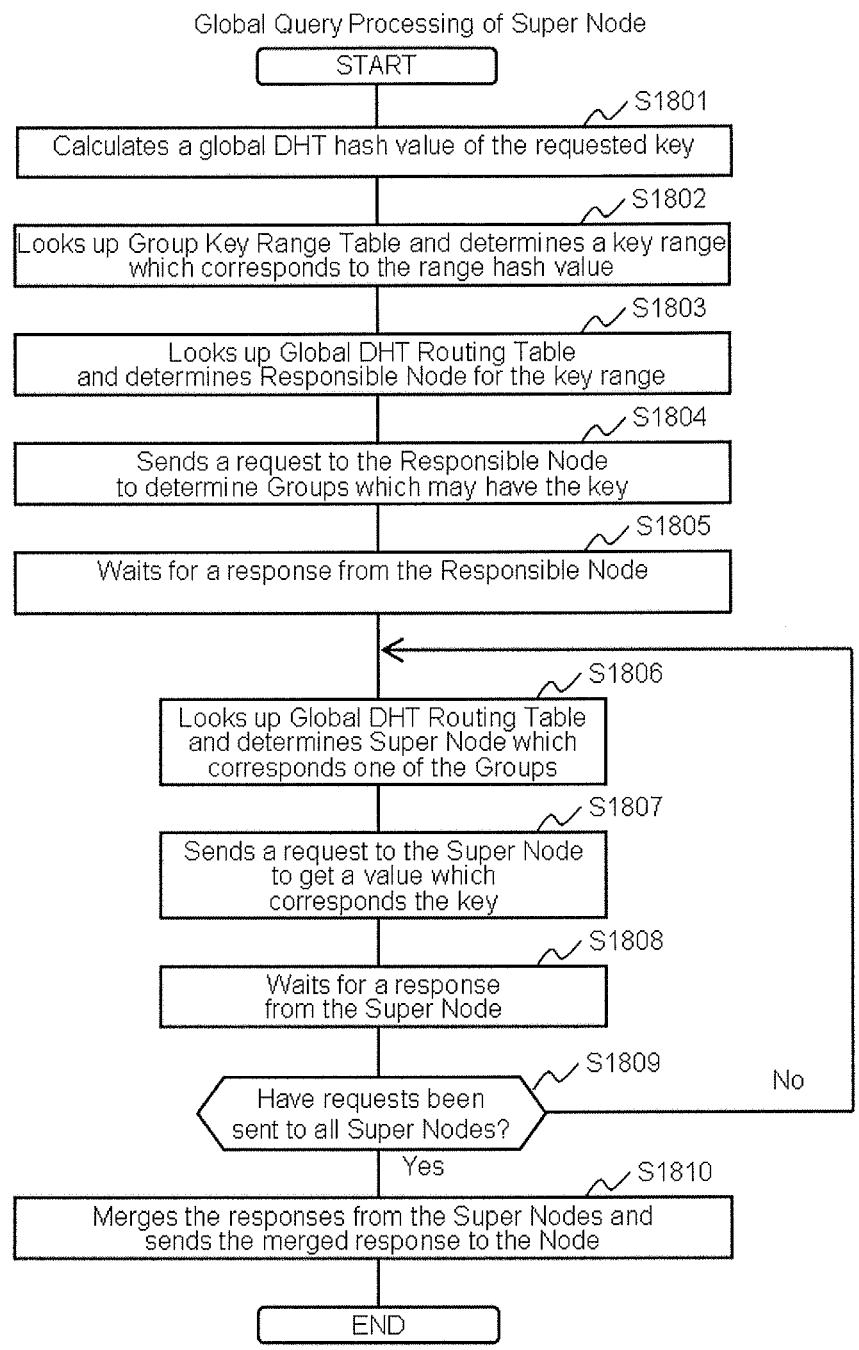
FIG. 18 is a flow diagram illustrating exemplary steps of Global Query Processing of a Super Node.

When the Super Node receives the request from the Node 1, the Super Node executes a Global Query Processing by using a Query Management Program 34. FIG. 18 is a flow diagram illustrating exemplary steps of the Global Query Processing. First, the Super Node calculates a global DHT hash value of a key which is included in the request (S1801). Next, the Super Node looks up a Group Key Range Table 46 and determines a key range to which the global DHT hash value of the key belongs (S1802). The Super Node looks up a Global DHT Routing Table 43 and determines a Responsible Node for the key range (S1803). Then, the Super Node sends a request including the key to the Responsible Node to determine Groups 3 which may have the key (S1804) and waits for a response from the Responsible Node (S1805). The Responsible Node identifies at least one group corresponding to the group key range that may have values corresponding to the query key in one or more nodes thereof, based on the group key range of the query key, and then sends the information of the identified group or groups to the Super Node. After the Super Node receives the response, the Super Node looks up a Global DHT Routing Table 43 and determines another Super Node which belongs to one of the Groups 3 (S1806). Next, the Super Node sends a request to that Super Node to get a value which corresponds to the key (S1807) and waits for a response from the Super Node (S1808). The Super Node repeats steps S1806 to S1808 for the Super Nodes for all Groups 3 determined in the step S1804 (S1809). Lastly, the Super Node merges the responses from the Super Nodes and sends the merged response to the Node 1. Alternatively, it is also possible that after the step S1805, the Super Node itself executes step 1806, i.e. looks up the Global DHT Routing Table and determines a Super Node which corresponds to one of the groups. Then, the Super Node sends the request to the Super Node which belongs to the group or groups corresponding to the group key range that may have values corresponding to the query key in one or more nodes thereof directly. With this, the waiting time of the step S1805 can be reduced.

Figure 19:
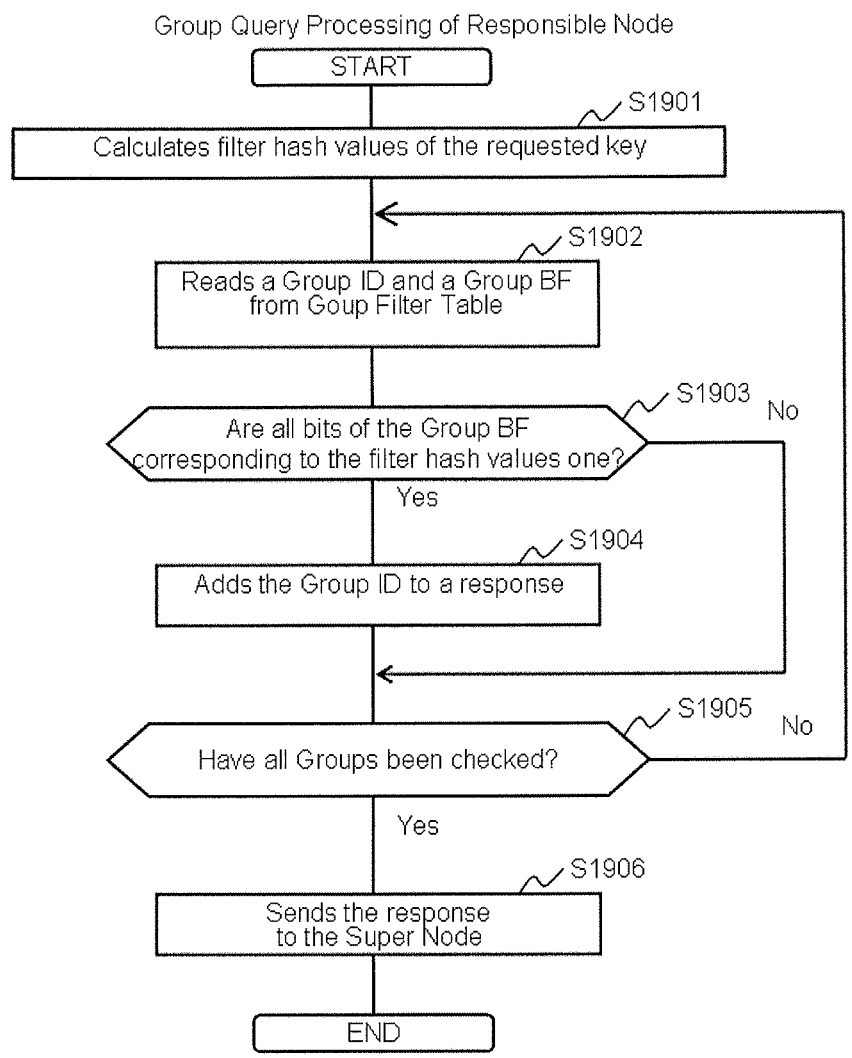
FIG. 19 is a flow diagram illustrating exemplary steps of Group Query Processing executed by a Responsible Node.

FIG. 19 is a flow diagram illustrating exemplary steps of Group Query Processing executed by a Responsible Node. When a Responsible Node receives the request to determine Groups 3 which may have a specified key, the Responsible Node executes this processing by using a Query Management Program 34. First, the Responsible Node calculates filter hash values of the specified key (S1901). Next, the Responsible Node gets a Group ID 451 and a Bloom Filter 452 from the first row of a Group Filter Table 45 (S1902). If all bits of the Bloom Filter 452 corresponding to the filter hash values are one (S1903), the Responsible Node adds the Group ID 451 to a response (S1904) and repeats the steps from S1902 to S1904 for all rows in the Group Filter Table 45 (S1905). If all bits of the Bloom Filter 452 corresponding to the filter hash values are not one, step S1904 is bypassed and the flow proceeds to step S1905 to check for remaining Groups 3. After all Groups 3 have been checked, the Responsible Node sends the response to the Super Node (S1906).

The Responsible Node may alternatively send requests directly to the Super Nodes without requiring the intervening Super Node which sent the request to the responsible node initially. In that case, the Super Nodes may respond back to the Responsible Node or directly to the Super Node which sent the request to the Responsible Node.

Figures 20, 21:
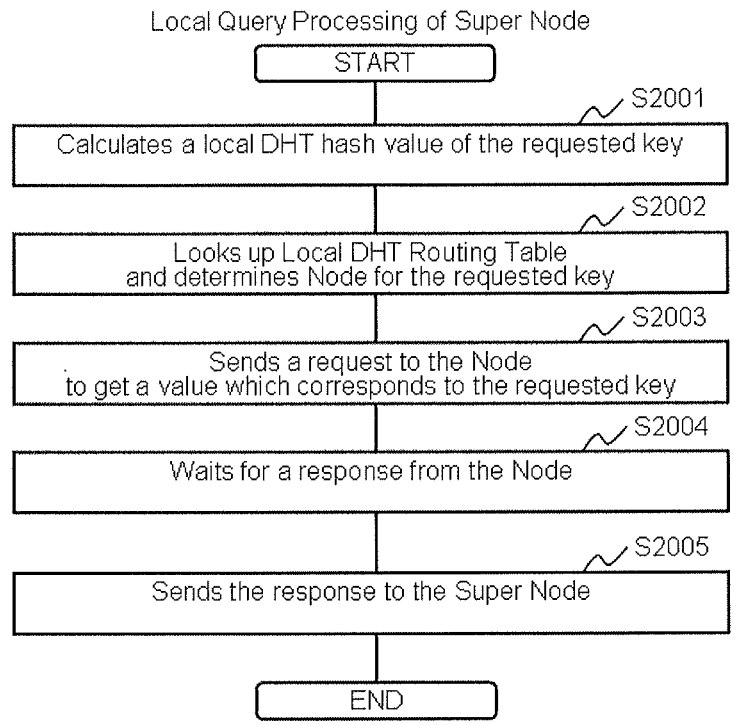
FIG. 20 is a flow diagram illustrating exemplary steps of Local Query Processing executed by a Super Node.
FIG. 21 shows an example of a Node Filter Summary Table.

FIG. 20 is a flow diagram illustrating exemplary steps of Local Query Processing executed by a Super Node. When a Super Node receives a request to obtain a value which corresponds to a specified key, the Super Node executes this processing by using a Query Management Program 34. First, the Super Node calculates a local DHT hash value of the specified key (S2001). Next, the Super Node looks up a Local DHT Routing Table 42 and determines a Node 1 which is responsible for the specified key (S2002). Then, the Super Node sends a request to the Node 1 to get a value which corresponds to the specified key (S2003) and waits for a response from the Node 1 (S2004). After the Super Node receives the response, the Super Node sends the response to the Super Node which originally sent the request (S2005). With this embodiment, the amount of traffic between the groups can be reduced.

A second embodiment of the present invention will be described next. The explanation will mainly focus on differences from the first embodiment.

In the first embodiment, a Super Node periodically collects Node Bloom Filters from Nodes 1. In this second embodiment, each Node 1 periodically pushes its Node Bloom Filter to the Super Node which belongs to the same Group 3.

Figure 22:
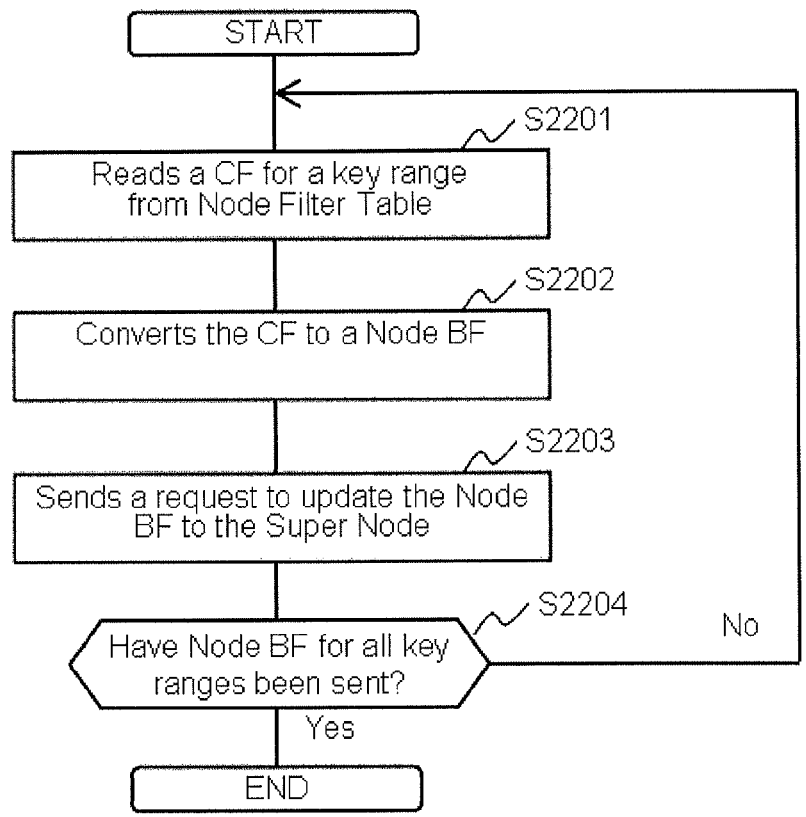
FIG. 22 is a flow diagram illustrating exemplary steps of Node Filter Sending Processing in a second embodiment.

FIG. 22 is a flow diagram illustrating exemplary steps of Node Filter Sending Processing executed by a Node 1 in this second embodiment. A Node 1 periodically executes this processing by using a Filter Management Program 33. First, the Node 1 reads a Counting Filter for a first key range from a Node Filter Table 44 (S2201). Next, the Node 1 converts the Counting Filter to a Node Bloom Filter (S2202). Then, the Node 1 sends a request to the Super Node in the same Group 3 to update the Node Bloom Filter of the Node 1 for the key range (S2203). The Node 1 repeats the steps from S2201 to S2203 for all key ranges (S2204).

Figure 23:
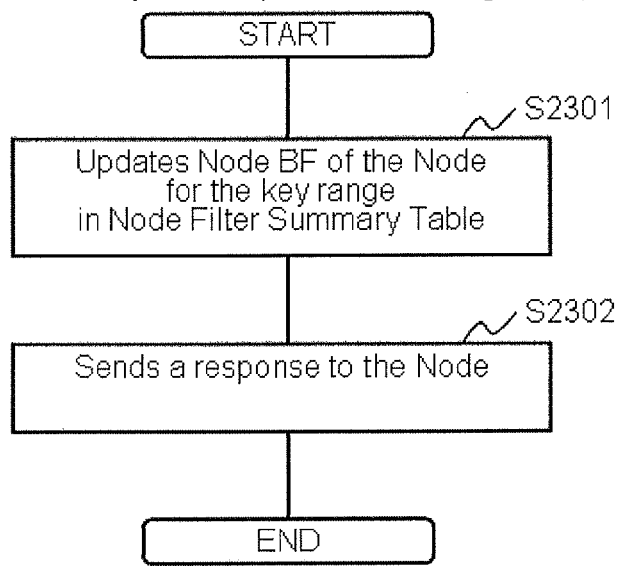
FIG. 23 is a flow diagram illustrating exemplary steps of Node Filter Summary Table Update Processing executed by a Super Node.

FIG. 23 is a flow diagram illustrating exemplary steps of Node Filter Summary Table Update Processing executed by a Super Node. When a Super Node receives a request from a Node 1 to update a Node Bloom Filter of the Node 1, the Super Node executes this processing by using a Filter Management Program 33. First, the Super Node 1 updates a Node Filter Summary Table 48 according to the request (S2301).

FIG. 21 shows an example of a Node Filter Summary Table 48. The Super Node has a Node Filter Summary Table 48 in its main memory 12, containing Bloom Filters of all Nodes 1 in the same Group 3 for all key ranges. A Node Filter Summary Table 48 may have, but is not limited to, three columns, including Local ID 481, Key Range ID 482 and Bloom Filter 483.

In the step S2301, the Super Node updates a Bloom Filter 483 of a row in the Node Filter Summary Table 48 which corresponds to the combination of the Node 1 and the key range. Lastly, the Super Node sends a response to the Node 1 (S2302).

Figure 24:
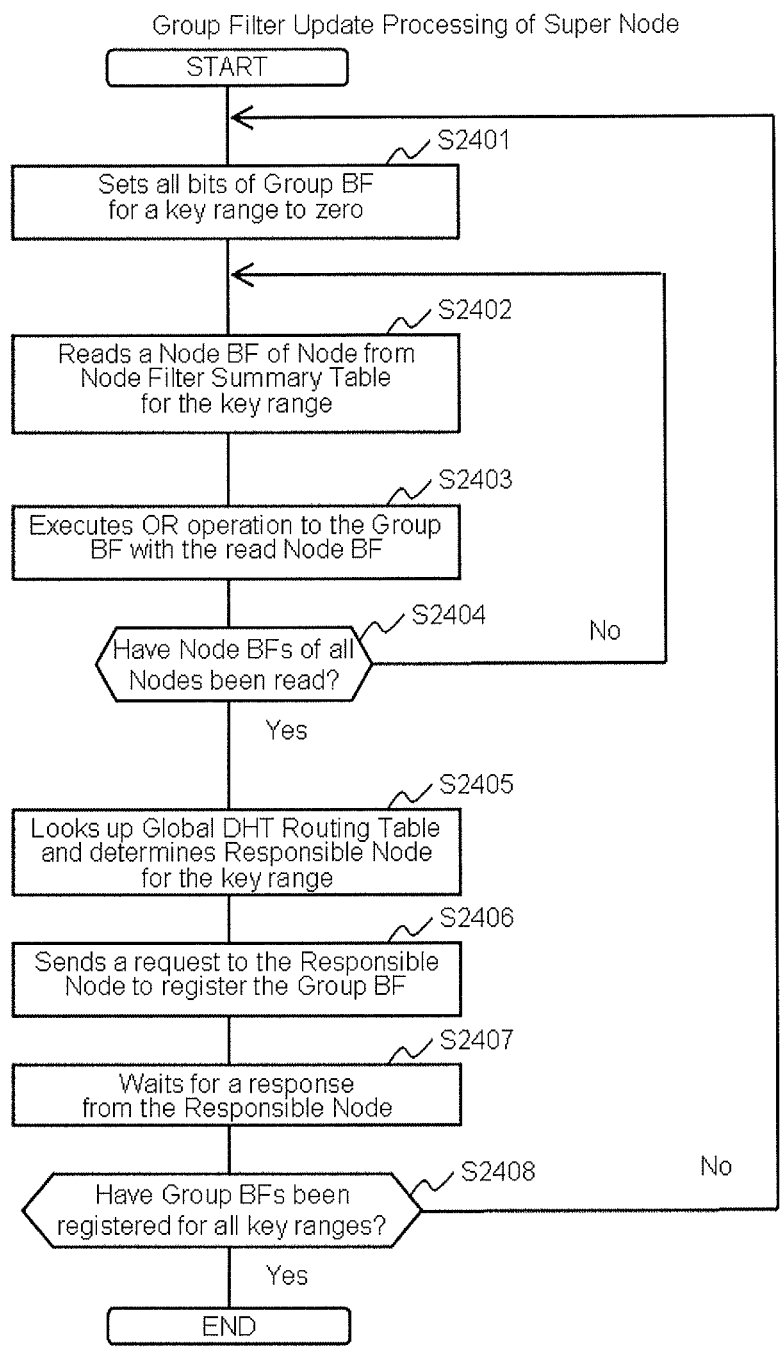
FIG. 24 is a flow diagram illustrating exemplary steps of Group Filter Update Processing executed by a Super Node in the second embodiment.

FIG. 24 is a flow diagram illustrating exemplary steps of Group Filter Update Processing executed by a Super Node in this second embodiment. A Super Node periodically executes this processing by using a Filter Management Program 33. First, the Super Node sets all bits of a Group Bloom Filter to zero for a first key range (S2401). Next, the Super Node reads a Node Bloom Filter of a first Node 1 in the same Group 3 from a Node Filter Summary Table 48 for the key range (S2402). Then, the Super Node executes an OR (logical disjunction) operation to the Group Bloom Filter and the Node Bloom Filter (S2403). The Super Node repeats steps S2402 to S2403 for all Nodes 1 including itself (S2404). After that, the Super Node executes the same steps as S1506 to S1509 in the first embodiment. In this embodiment, the node sends its Node Bloom Filter to a Super Node immediately after a value is updated. Therefore, the Group Bloom Filter is made more accurate.

A third embodiment of the present invention will be described next. The explanation will mainly focus on differences from the first and second embodiments.

In the first and second embodiments, the load on a Super Node tends to be high because a Super Node executes all OR operations. In the third embodiment, OR operations are distributed to Nodes 1 in the same Group 3 to reduce the load on the Super Node.

Figure 25:
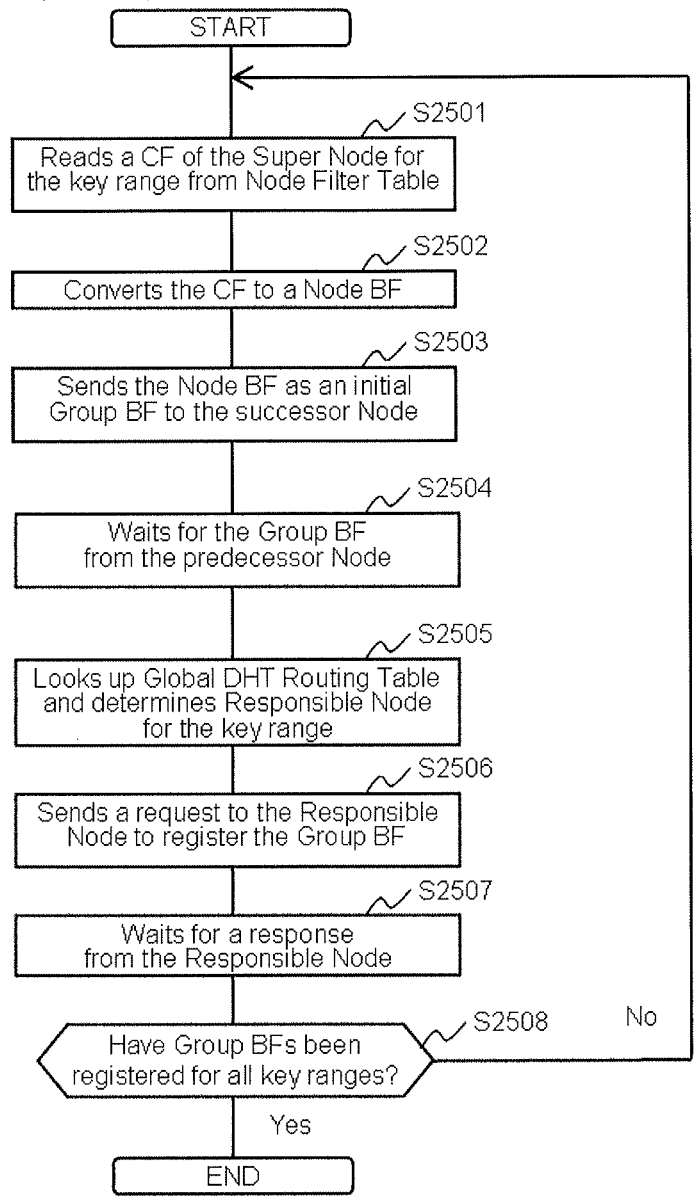
FIG. 25 is a flow diagram illustrating exemplary steps of Group Filter Update Processing executed by a Super Node in a third embodiment.

FIG. 25 is a flow diagram illustrating exemplary steps of Group Filter Update Processing executed by a Super Node in this third embodiment. A Super Node executes this processing periodically by using a Filter Management Program 33. First, the Super Node reads its own Counting Filter for a first key range from its Node Filter Table 44 (S2501) and converts the Counting Filter to a Node Bloom Filter (S2502). Then, the Super Node sends the Node Bloom Filter to the successor Node 1 as an initial Group Bloom Filter (S2503) and waits for the Group Bloom Filter which would be sent back from the predecessor Node 1 (S2504). After that, the Super Node executes the same steps as S1506 to S1509 in the first embodiment.

Figures 26, 27:
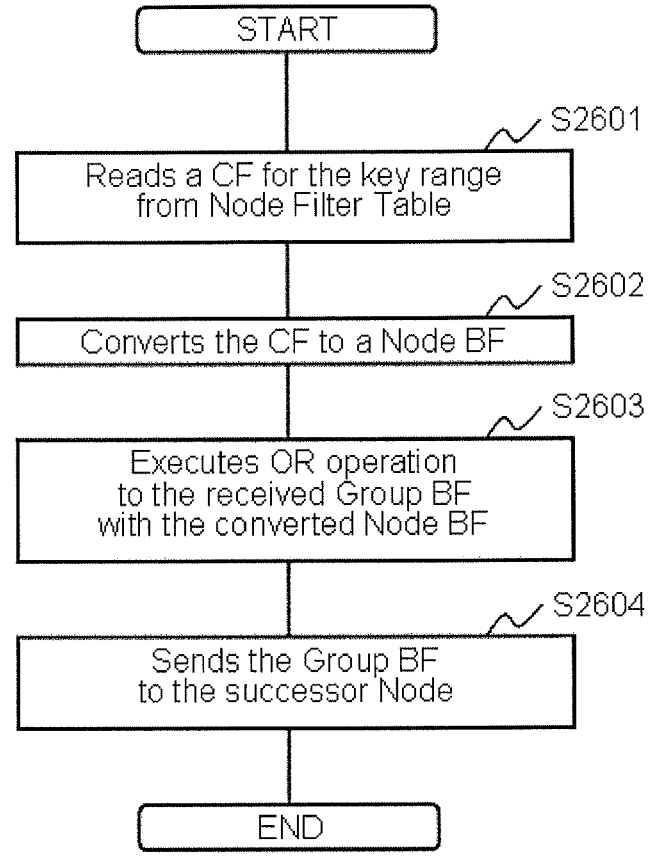
FIG. 26 is a flow diagram illustrating exemplary steps of Group Filter Update Processing executed by a Node in the third embodiment.
FIG. 27 shows an example of a System Key Range Table.

FIG. 26 is a flow diagram illustrating exemplary steps of Group Filter Update Processing executed by a Node in this third embodiment. A Node 1 executes this processing by using a Filter Management Program 33 when the Node 1 receives a Group Bloom Filter from the predecessor Node 1. First, the Node 1 reads its own Counting Filter for the key range from its Node Filter Table 44 (S2601) and converts the Counting Filter to a Node Bloom Filter (S2602). Then, the Node 1 executes an OR operation to the received Group Bloom Filter with the converted Node Bloom Filter (S2603). Lastly, the Node 1 sends the Group Bloom Filter to the successor Node 1 (S2604). With this flow, the load on the Super Node can be reduced.

A fourth embodiment of the present invention will be described next. The explanation will mainly focus on differences from the first embodiment.

In the first embodiment, key ranges are fixed. However, the more keys that are stored in a Group 3, the less accurate a Group Bloom Filter of the Group 3 becomes. Therefore, in this fourth embodiment, if the accuracy rate of a Group Bloom Filter is less than a threshold, each key range is divided into two or more key ranges to improve the accuracy rate of the Group Bloom Filter. With this embodiment, the accuracy of the Group Bloom Filter can be maintained.

Figures 11, 12, 13:
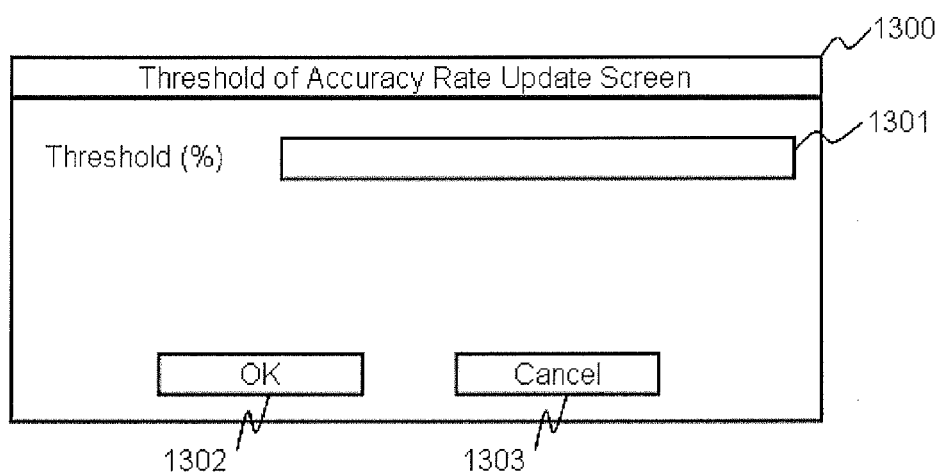
FIG. 11 shows an example of an Accuracy Table.
FIG. 12 shows an example of a Node Key Range Table.
FIG. 13 shows an example of a Threshold of Accuracy Rate Update Screen.

FIG. 11 shows an example of an Accuracy Table 47. Each Super Node has an Accuracy Table 47 in its main memory 12. An Accuracy Table 49 may have, but is not limited to, one row with three columns, including Number of Total Requests 471, Number of Failed Requests 472 and Threshold 473.

An administrator may update a Threshold 473 by using a Threshold of Accuracy Rate Update Screen 1300. FIG. 13 shows an example of a Threshold of Accuracy Rate Update Screen 1300, containing a text box 1301 which enables an administrator to specify a threshold of an accuracy rate of a Group 3, a button 1302 to apply a specified threshold and a button 1303 to cancel an update of the threshold.

Figure 28:
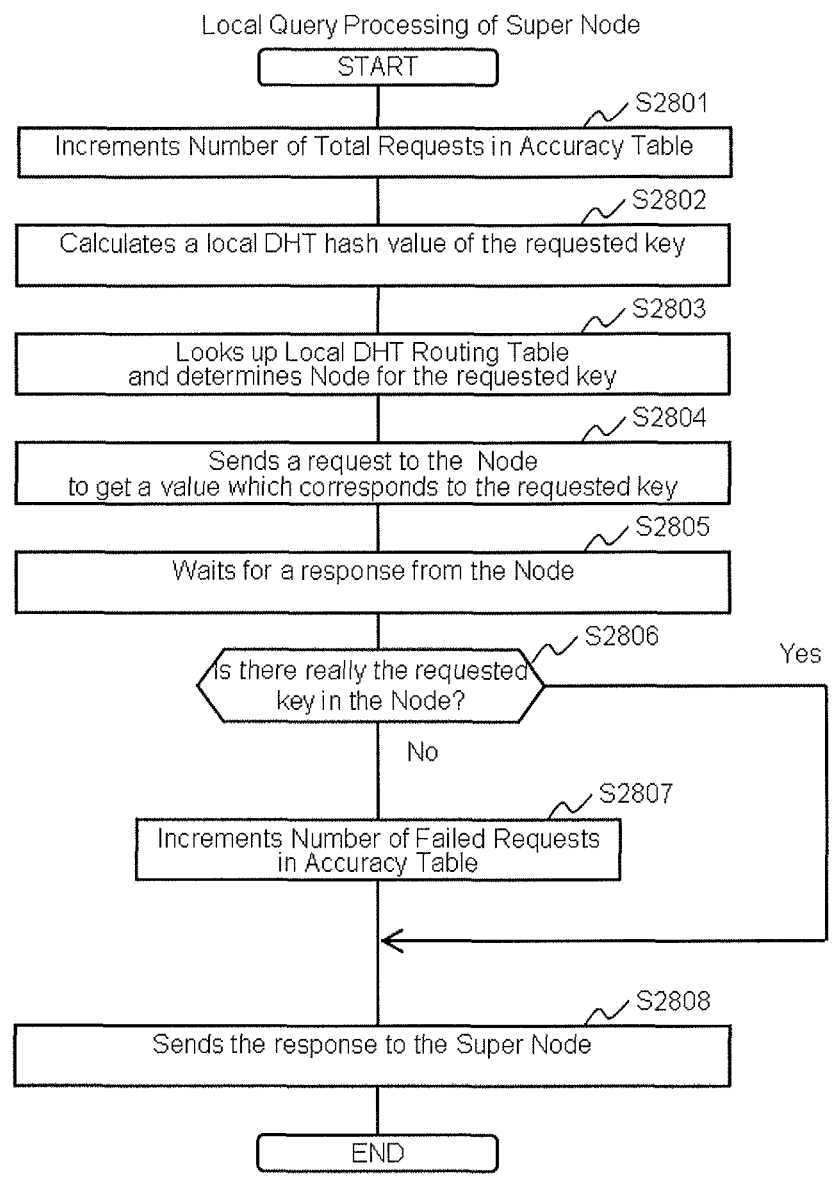
FIG. 28 is a flow diagram illustrating exemplary steps of Local Query Processing in the third embodiment.

FIG. 28 is a flow diagram illustrating exemplary steps of Local Query Processing executed by a Super Node in this fourth embodiment. First, a Super Node increments the Number of Total Requests 471 in the Accuracy Table 47 (S2801). Steps from S2802 to S2805 correspond to steps from S2001 to S2004 in the first embodiment. After the step S2805, the Super Node checks whether there is really the requested key in the Node 1 (S2806). If the requested key is not in the Node 1, then it can be considered that the Group Bloom Filter fails. Therefore, the Super Node increments the Number of Failed Requests 472 in the Accuracy Table 47. Lastly, the Super Node executes the same step as S2005 (S2808).

Figure 29:
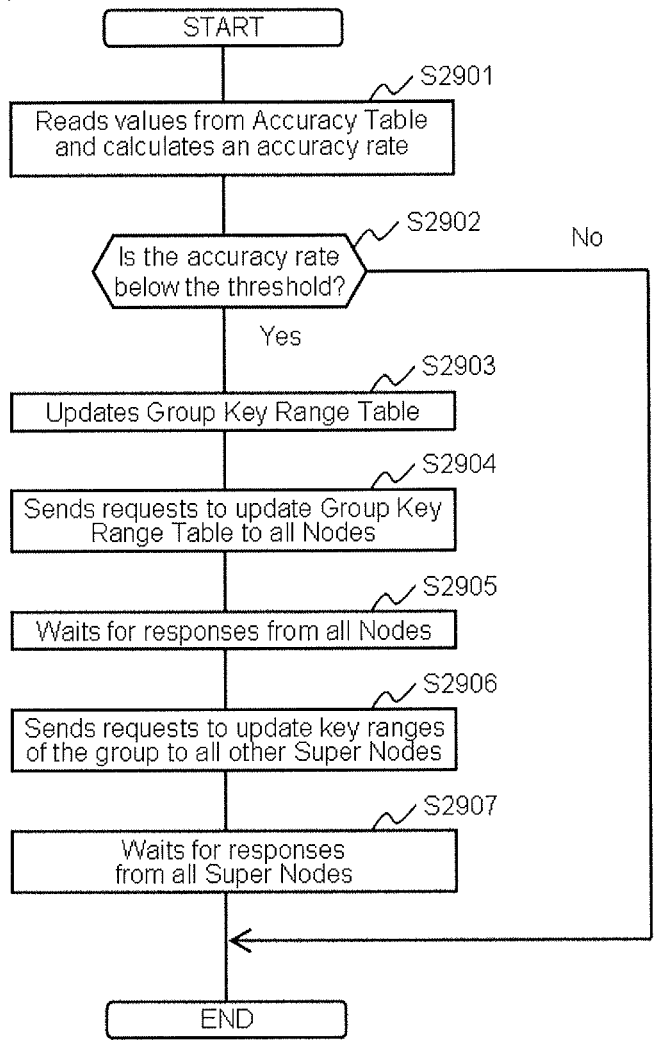
FIG. 29 is a flow diagram illustrating exemplary steps of Group Key Range Table Update Processing executed by a Super Node.

FIG. 29 is a flow diagram illustrating exemplary steps of Group Key Range Table Update Processing executed by a Super Node. A Super Node periodically executes this processing by using a Filter Management Program 33. First, the Super Node reads values from the Accuracy Table 47 and calculates an accuracy rate (S2901). Next, the Super Node checks whether the accuracy rate is below the threshold (S2902). If yes, the Super Node updates its Group Key Range Table 46 (S2903). For example, the Super Node may divide each key range into two key ranges. Then, the Super Node sends requests to update the Group Key Range Table 46 to all Nodes 1 in the same Group 3 (S2904) and waits for responses (S2905). After the Super Node receives all of the responses, the Super Node sends requests to update key ranges of the Group 3 to all other Super Nodes (S2906) and waits for responses (S2907).

Figure 30:
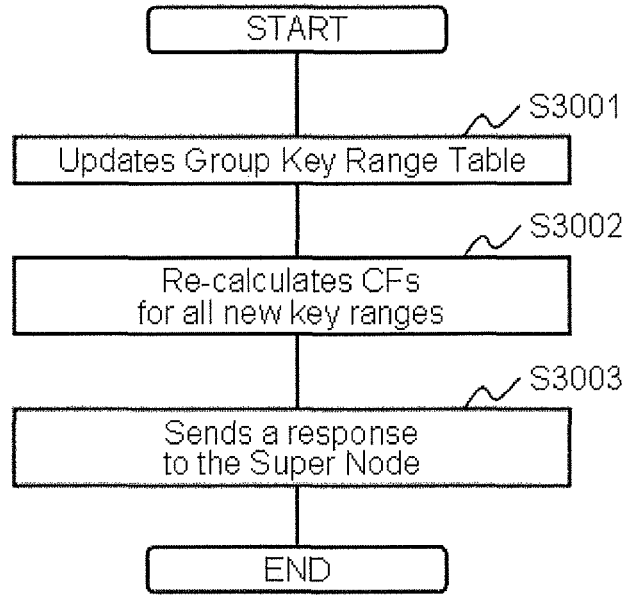
FIG. 30 is a flow diagram illustrating exemplary steps of Group Key Range Table Update Processing executed by a Node.

If a Node 1 receives a request to update a Group Key Range Table 46 from a Super Node, the Node 1 executes Group Key Range Table Update Processing by using a Filter Management Program 33. FIG. 30 is a flow diagram illustrating exemplary steps of Group Key Range Table Update Processing executed by a Node 1. First, the Node 1 updates its Group Key Range Table according to the request (S3001). Then, the Node 1 re-calculates Counting Filters for all new key ranges (S3002). Lastly, the Node 1 sends a response to the Super Node (S3003).

Figure 31:
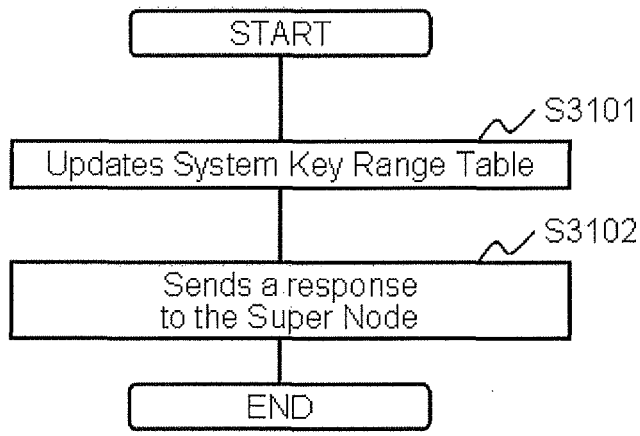
FIG. 31 is a flow diagram illustrating exemplary steps of System Key Range Table Update Processing executed by a Super Node.

If a Super Node receives a request to update key ranges of another Group 3, the Super Node executes System Key Range Table Update Processing by using a Filter Management Program 33. FIG. 31 is a flow diagram illustrating exemplary steps of System Key Range Table Update Processing executed by a Super Node. First, the Super Node updates its System Key Range Table 49 (S3101).

FIG. 27 shows an example of a System Key Range Table 49. Each Super Nodes has a System Key Range Table 49 in its main memory 12, containing current key ranges of all Groups 3. A System Key Range Table 49 may have, but is not limited to, two columns, including Group ID 491 and Key Range List 492. A Key Range List 492 consists of minimum values of key ranges.

After the Super Node updates the System Key Range Table 49 in the step S3101, the Super Node sends a response to the Super Node (S3102).

A fifth embodiment of the present invention will be described next. The explanation will mainly focus on differences from the first embodiment and fourth embodiment.

Re-calculation of Counting Filters in the step S3002 usually takes very long time because all keys in a Node 1 need to be read. To avoid such re-calculation, Nodes 1 may have segmented key ranges (node key ranges).

FIG. 12 shows an example of a Node Key Range Table 50. Each Node 1 has a Node Key Range Table 50 in its main memory 12. A Node Key Range Table 50 may have, but is not limited to, three columns, including Key Range ID 501, Min Value 502 and Max Value 503. Information on segmented key ranges is stored in the Node Key Range Table 50.

Figure 32:
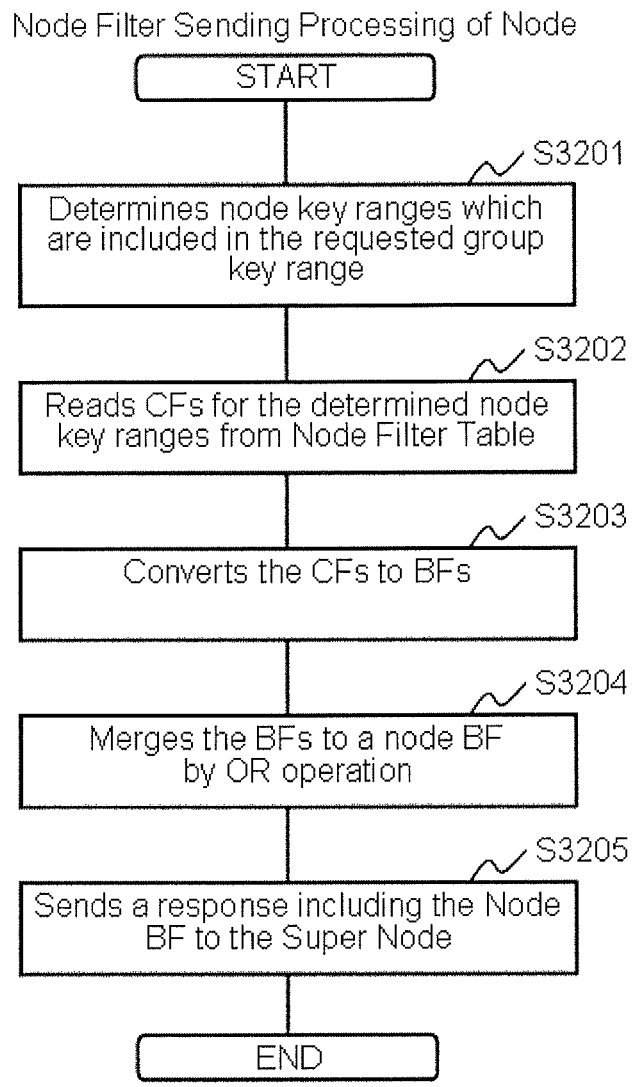
FIG. 32 is a flow diagram illustrating exemplary steps of Node Filter Sending Processing in a fifth embodiment.

FIG. 32 is a flow diagram illustrating exemplary steps of Node Filter Sending Processing executed by a Node 1 in this fifth embodiment. First, a Node 1 determines node key ranges which are included in the requested key range (group key range) in the step S3201. Next, the Node 1 reads Counting Filters for the determined node key ranges from its Node Filter Table 44 (S3202). Then, the Node 1 converts the Counting Filters to Bloom Filters (S3203) and merges the Bloom Filters into a Node Bloom Filter by an OR operation (S3204). Lastly, the Node 1 sends a response including the Node Bloom Filter to the Super Node (S3205).

In the fifth embodiment, the step S3002 is not necessary.

If indexing information for a keyword search is also stored in Nodes 1, searching across Groups 3 can be realized according to a sixth embodiment.

Figure 35:
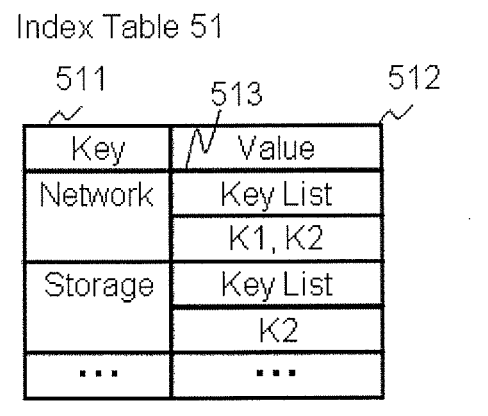

FIG. 35 shows an example of an Index Table 51 in this sixth embodiment. Data in the Index Table 51 are distributed among Nodes 1 similarly to data in the Key-Value Table 41. The Index Table 51 also consists of Key 511 and Value 512. Further, the Value 512 contains a Key List 513. The Key 511 of a row contains a keyword included in the Key-Value Table 41. The Key List 513 of the row contains a list of keys whose values include the keyword. Therefore, the index for data (values) stored in a Group 3 is distributed among Nodes 1 belonging to the Group 3. Processing of looking up the index for multiple keywords can be distributed to multiple Nodes 1. As a result, parallel search performance can be improved. In addition, a Node 1 belonging to a Group 3 can obtain the index of other Groups 3 and determine which Nodes 1 in other Groups 3 have data (values) with a keyword according to the same processing described in FIGS. 18, 19 and 20. As a result, searching across Groups 3 can be realized.

In the above embodiment, there are two hierarchies—a local DHT overlay and a global DHT overlay. In a case in which the amount of data is huge, the system can have more than two hierarchies. In that case, the upper layer of the DHT overlay manages a plurality of lower layers of the DHT ring. In each layer, Nodes 1 organize a Group 3 and a Super Node is selected for each Group 3. Such a Super Node collects Node Filters from all Nodes 1 belonging to the same Group 3, calculates a Group Filter based on the collected Node Filters, and stores the calculated Group Filter in Group Filter Table 45. Then, such Super Nodes organize a Group 3 in an upper layer and one of the Super Nodes (referred as a Super Node in the upper layer) is selected for each Group 3 in the upper layer. Such a Super Node in the upper layer collects Group Filters in the lower layer from all Super Nodes belonging to the same Group 3 in the upper layer, calculates the Group Filter in the upper layer based on the collected Group Filters in the lower layer, and stores the calculated Group Filter in the upper layer in Group Filter Table 45. Such Super Nodes in the upper layer organize a Group 3 in a further upper layer.

While the invention has been described in terms of its preferred embodiments, numerous modifications may be made without departing from the spirit and scope of the present invention. It is intended that all such modifications fall within the scope of the appended claims.

We claim:

1. A data processing method for a system comprising one or more groups interconnected by a network, each group having at least one node, and each node being configured to store values and identifiers of the values as keys, the method comprising the steps of:

receiving a request including a query key by a first one of the groups;

determining a group key range of the query key;

determining a responsible node of a second group, which is responsible for the group key range of the query key;

sending the query key to the responsible node of the second group;

identifying, by the responsible node of the second group, at least one group corresponding to the group key range that may have values corresponding to the query key in one or more nodes thereof, based on the group key range of the query key;

sending the query key to the at least one group identified by the responsible node of the second group;

obtaining a value corresponding with the query key from the at least one group;

sending the value corresponding with the query key to the first group; and sending the value corresponding with the query key from the first group to the requestor which originally sent the request;

wherein each group includes plural nodes including at least one super node, and the at least one super node is configured to;

periodically send request to all nodes in the same group to get a node filter for each group key range, receive the node filters from the nodes, merge all of the nodes filters into a group filter for the group key range, and register the group filter with a group ID of a group to which the super node belongs, to a responsible node for the group key range.

2. The data processing method according to claim 1, wherein the method further comprises the steps of:

storing, by each node, group key ranges and corresponding group key range identifiers in a group key range table, and a node filter in a node filter table, each node filter being based on keys which correspond to values stored in the node and belonging to corresponding group key ranges;

generating and storing, by each super node, a group filter table holding group filters based on the node filters, the group filters being stored with a correspondence with group IDs in the group filter table;

wherein the step of receiving the request by a first one of the groups further sends the request from a node of the first group to the super node of the first group;

the step of determining a group key range of the query key is performed by the super node of the first group based on the group key range table;

the step of determining the responsible node of the second group is performed by the super node of the first group based on the group key range table;

the step of sending the query key to the responsible node of the second group is performed by the super node of the first group;

the step of sending the value corresponding with the query key sends the value to the super node in the first group, which sends the value to the node of the first group; and the step of sending the value to the requestor which originally sent the request is performed by the node of the first group.

3. The data processing method according to claim 2, further comprising the steps of:

determining a local ID of each node by calculating a hash value of an IP address of the node, and determining a global ID of each super node by calculating a hash value of a combination of an IP address of the super node and a group ID of a group to which the super node belongs.

4. The data processing method according to claim 3, wherein, a super node with a global ID which is numerically closest clockwise to a hash value of a minimum value of a group key range, is selected as a responsible node for the group key range.

5. The data processing method according to claim 3, wherein, a super node with a global ID which is numerically closest clockwise to a hash value of a maximum value of a group key range, is selected as a responsible node for the group key range.

6. The data processing method according to claim 3, wherein, a node which has the smallest local ID in the same group is selected as a super node.

7. The data processing method according to claim 2, wherein, a node filter is a counting filter and a group filter is a bloom filter.

8. The data processing method according to claim 2, wherein, a node sends, when a value is updated in the node, a node filter for each group key range to the super node in the same group, and the super node stores the node filter to a node filter summary table.

9. The data processing method according to claim 2, wherein, a super node sends a node filter for each group key range to a node whose local ID is numerically closest clockwise to a local ID of the super node, a node receiving the node filter merges a node filter of the node and the received node filter and sends the merged node filter to a node whose local ID is numerically closest clockwise to a local ID of the node, and the super node receiving the node filter registers the node filter as a group filter for the group key range to the responsible node for the group key range.

10. The data processing method according to claim 2, wherein, a super node stores the total number of requests with query keys sent by other super nodes, and the number of requests with query keys corresponding to values which are not stored in any nodes in the same group, in an accuracy table, a super node stores key ranges of all groups in a system key range table, and a super node:

periodically calculates an accuracy rate by looking up the accuracy table, divides each key range into two or more ranges if the accuracy rate is below the threshold, and sends a request to nodes in the same group to update their respective group key range tables, each node:

updates its group key range table, recalculates node filters for all group key ranges, and sends a response to the super node, and the super node sends a request to other super nodes to update their respective system key range tables.

11. The data processing method according to claim 10, wherein,
  each node divides keys into one or more node key ranges in advance, more finely than group key ranges, and stores the node key ranges in a node key ranges table,
  wherein when a node sends a node filter for a group key range to a super node, the node:
    determines node key ranges which are included in the group key range,
    merges node filters of the node key ranges into a node filter for the group key range, and
    sends the node filter for the group key range to the super node.

12. The data processing method according to claim 2, wherein,
  a node stores a plurality of keys each of which is corresponds to at least one value in an index key-value table.

13. A data processing apparatus belonging to a first group including a plurality of nodes, the data processing apparatus comprising:
  a processor, a memory, and a storage;
  wherein the processor is configured to:
    receive a request from a requestor for data corresponding to a query key included in the request;
    determine a group key range which corresponds to the query key;
    determine a responsible node of a second group different from the first group, the responsible node being a node which is responsible for the group key range corresponding to the query key;
    send the query key to the responsible node of the second group;
    receive a value corresponding to the query key from at least one group which is identified as corresponding to the group key range that may have values corresponding to the query key in one or more nodes thereof, based on the group key range of the query key sent to the responsible node;
    send the value corresponding to the query key to the first group; and
    send the value corresponding to the query key from the first group to the requestor with originally sent the request;
  wherein the processor is further configured to;
    periodically send request to all nodes in the first group to get a node filter for each group key range,
    receive the node filters from the nodes,
    merge all of the filters into a group filter for the group key range, and
    register the group filter with a group ID of a group to which the data processing apparatus belong, to a responsible node for the group key range.

14. The data processing apparatus according to claim 13, wherein the processor is further configured to:
  store, in the memory, group key ranges and corresponding group key range identifiers in a group key range table, and node filters in a node filter table, each node filter being based on keys which correspond to values stored in the memory and belonging to corresponding group key ranges;
  generate and store, in the memory, a group filter table holding group filters based on the node filters, the group filters being stored with a correspondence with group IDs in the group filter table;
  determine the group key range based on the group key range table; and
  determine the responsible node of the second group based on the group key range table.

15. The data processing apparatus according to claim 14, wherein the processor is further configured to:
  determine a local ID of the data processing apparatus by calculating a hash value of an IP address of the data processing apparatus, and
  determine a global ID of the data processing apparatus by calculating a hash value of a combination of an IP address of the data processing apparatus and a group ID of the first group.

16. The data processing apparatus according to claim 13, wherein the processor is further configured to:
  receive, when a value is updated in one of the nodes of the first group, a node filter for each group key range; and
  store the node filter to a node filter summary table in the memory.

17. The data processing apparatus according to claim 13, wherein the processor is further configured to:
  send a node filter for each group key range to a node whose local ID is numerically closest clockwise to the data processing apparatus;
  receive a merged node filter resulting from merger of a node filter of the data processing apparatus and a node filter of a node whose local ID is numerically closest counterclockwise to the local ID of the data processing apparatus; and
  register the node filter as a group filter for the group key range to the responsible node for the group key range.

18. The data processing apparatus according to claim 13, wherein the processor is further configured to:
  store the total number of requests with query keys sent by other groups, and the number of requests with query keys corresponding to values which are not stored in any nodes in the first group, in an accuracy table,
  store key ranges of all groups in a system key range table,
  periodically calculate an accuracy rate by looking up the accuracy table,
  divide each key range into two or more ranges if the accuracy rate is below a threshold,
  send a request to nodes in the first group to update their respective group key range tables; and
  send a request to other groups to update their respective system key range tables.

* * * * *